United States Patent [19]

Abbott

[11] Patent Number: 4,604,687

[45] Date of Patent: Aug. 5, 1986

[54] METHOD AND SYSTEM FOR STORING AND RETRIEVING MULTIPLE CHANNEL SAMPLED DATA

[75] Inventor: Curtis W. Abbott, San Rafael, Calif.

[73] Assignee: Lucasfilm Ltd., San Rafael, Calif.

[21] Appl. No.: 522,024

[22] Filed: Aug. 11, 1983

[51] Int. Cl.⁴ .................. G06F 13/00; G11B 3/74
[52] U.S. Cl. ................... 364/200; 364/300; 369/94; 369/276
[58] Field of Search ... 364/200 MS File, 900 MS File; 369/32, 33, 41, 94, 56, 280, 276; 360/78, 77, 32, 13, 97, 81

[56] References Cited

U.S. PATENT DOCUMENTS

| | | | |
|---|---|---|---|
| 3,337,852 | 8/1967 | Lee et al. | 364/900 |
| 3,629,860 | 12/1971 | Capozzi | 364/200 |
| 4,241,420 | 12/1980 | Fish et al. | 364/900 |
| 4,270,154 | 5/1981 | Crawford | 360/98 |
| 4,368,513 | 1/1983 | Meltzer | 364/200 |
| 4,464,689 | 8/1984 | Propst | 360/78 |
| 4,468,730 | 8/1984 | Dodd et al. | 364/200 |
| 4,476,526 | 10/1984 | Dodd | 364/200 |
| 4,497,023 | 1/1985 | Moorer | 364/200 |

Primary Examiner—Gareth D. Shaw
Assistant Examiner—K. Kriess
Attorney, Agent, or Firm—Majestic, Gallagher, Parsons & Siebert

[57] ABSTRACT

A method and system for recording and playing back from a bulk digital data storage medium having unequal access time, such as a rotating magnetic disk, data of a plurality of separate files, such as multi-channel sound information. Blocks of the digital data streams are stored in physically non-sequential scattered positions on a disk. The starting sectors of each recording track of the disk are not made the same but rather at least two different starting sectors are provided on alternating tracks in order to reduce the amount of access time between blocks of data. The blocks of data are read from the disk into a buffer memory in accordance with a disk read head scheduling technique that causes the next block of data with the shortest access time to be transferred unless there is an urgency to maintain balance in the various channels, in which case a block of data for the channel having the least buffered data is transferred next. This general criteria is altered under certain special circumstances, however, in order to take advantage of opportunities to read or write some other block of data without adding any access time, or to make sure that no channel runs out of buffered data. The technique allows the rate of data transfer to and from the disk to be maximized, considering the necessary limitation of buffer memory size and a desire in many cases to do transfers in real time, both reading and writing. The technique is especially advantageous when the data channels require editing by shifting their relative timing, often the case in multi-channel sound recording.

20 Claims, 11 Drawing Figures

GLOBAL SYSTEM FOR READING OR WRITING ONE ALLOCATION UNIT (AU) OF DATA.

(SPLITRW)

(CHECK SPECIAL CASES)

(DECIDE RW)

(INSERT WRITE)

METHOD AND SYSTEM FOR STORING AND RETRIEVING MULTIPLE CHANNEL SAMPLED DATA

BACKGROUND OF THE INVENTION

This invention relates generally to multi-channel data transfer between, on one hand, a bulk storage media requiring unequal time to access blocks of data, such as a magnetic disk system read by one or more heads moved across the disk surface, and, on the other hand, a source/consumer of data or an intermediate buffer memory therefore.

Currently, the predominent technique for recording multi-channel digital data on a magnetic disk is to interleave data of the various channels in sequence. The most common type of currently available disk recording system uses a single read/write head for each rotating magnetic recording surface, and most multi-disk, multi-head systems still only allow one head to be operable for reading or writing at a time. Thus, data from the several channels is effectively formed into a single serial stream which is then written onto the disk and later read therefrom to recover the serial stream and thus reconstruct the multiple channel data.

Such a system is quite satisfactory for simple writing and reading of data but is quite awkward if editing is desired to be done on the recorded digital data. It is difficult to access the data of one channel independently of the others. It is practically impossible to time shift the data of one channel with respect to that of another. Such independence and time shifting is particularly desireable in editing multi-channel digital sound data in many applications such as in constructing a multi-channel movie sound track from various data files.

Therefore, it is a primary object of the present invention to provide a technique for writing to disk and reading therefrom digital data of two or more channels (films) that allows independent editing of each channel while at the same time maintaining a high degree of efficiency of transferring data onto and off of the disk.

It is another object of the present invention to provide a high degree of transfer efficiency with a limited size of buffer memory and with the ability to read and/or write digital data onto the disk in real time.

SUMMARY OF THE INVENTION

These and additional objects are accomplished by the various aspects of the present invention wherein, briefly, a number of static disk data allocation techniques and dynamic data transfer techniques are provided that individually and cooperatively operate with those advantages, as follows:

1. The incoming stream of digital information are broken into blocks of data, or allocation units (AU's), which are then written on to the various tracks of the disk in a non-sequential, scattered pattern of a random nature. Scattered storage allows a high degree of flexibility and freedom in accessing data of several distinct files with arbitrary time shifting between them.

2. The starting sector of the recorded AU's is not the same for each disk track, but rather at least two different rotational positions are selected for the starting sector of the different tracks. This results in reducing the access time between the scattered AU's.

3. When forming a schedule for reading data AU's from the disk into the buffer memory, a decision is made before reading each AU as to whether the AU on the disk having the shortest access time is to be next read, a technique which tends to maximize data transfer efficiency, or whether because the number of AU's in the buffer memory for each channel are grossly uneven the transfer of the next AU is required for a channel having the least data in the buffer memory. This trades off in a desirable manner the goal of minimizing the time necessary to access the next AU with the reality of a limited sized buffer memory and the desire to read data for all channels in real time. If the luxury of a very large buffer was enjoyed, the AU's with the shortest access time would be selected in most cases because the risk of a channel in the buffer running out of data is lower and thus a real time read-out from the buffer is assured for all channels. But in the usual practical case of a limited sized buffer memory, it is necessary to maintain some balance between the channels in the amount of buffered data in order to avoid one channel running out of data, and the present technique maximizes data transfer efficiency while doing so.

4. Other aspects of the present invention include taking advantage of special opportunities for scheduling the reading or writing of some data AU other than that selected by the technique above, wherein the existence of particular combinations of circumstances allows the reading or writing efficiency to be increased without degrading the balance of data in the buffer for each of the channels.

Additional objects, features and advantages of the present invention are included in the following description of a preferred embodiment thereof, which description should be taken in conjunction with the accompanying drawings.

DESCRIPTION OF A PREFERRED EMBODIMENT

Figure 1:
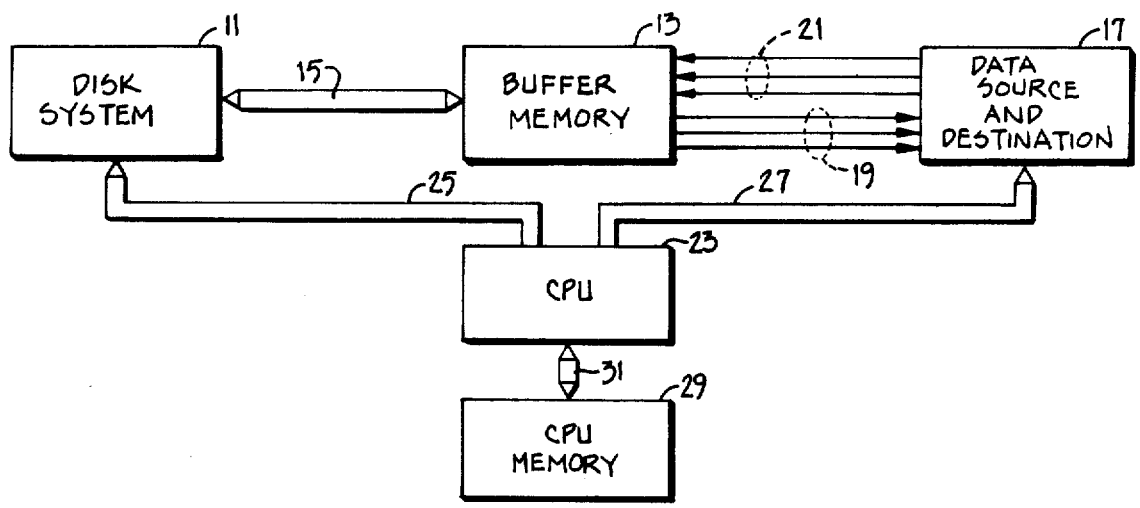
FIG. 1 is a general block diagram of a computer system in which the various aspects of the present invention can be implemented.

Referring to FIG. 1, a general computer system is illustrated with which the various techniques of the present invention can be implemented. A fixed disk memory 11 (disk system) is connected through a buffer memory 13 by lines 15 to equipment 17 (data source and destination) which utilizes data recorded in the mass storage medium 11 through lines 19 and which also provides data for storage in the system 11 through lines 21. The source of data within the equipment 17 may be any multi-channel stream of data wherein it is desired to be able to access the data within the memory system 11 for each channel independent of the other.

An application to multi-channel sound is discussed with respect to the system and method illustrated in the drawings, but the recording and retrieval of other types of data, such as seismic traces, raster images and the like, may also use the techniques of the present invention with considerable advantage. The utilization of data received in the lines 19 from the disk system 11 can be, for example, sound editing equipment within the utilization equipment 17, which receives the individual channel data from the disk system 11 through the lines 19. For the example being explained with respect to the drawings, the number of independent channels are assumed to be three in number, thus the data path 19 includes three separate lines for receiving multi-channel information from the disk system 11 and the data path 21 includes three lines for storing digital information on the disk system 11. Of course, any other number, two or more, of channels may take advantage of the various aspects of the present invention.

In order to control the operation of the disk system 11, the buffer memory 13 and the data source and destination equipment 17, a computer 23 (CPU) communicates control signals over bus 25 to the disk system 11 and over bus 27 to the source and destination equipment 17. Controlling programs are stored in a computer memory 29 (CPU Memory) which are communicated with the computer 23 over a bus 31. The memory 29 also keeps track of the physical addresses within the disk storage system 11 of the various components of the channels of data recorded on it for later access and reconstruction of the individual data streams.

Figure 2:
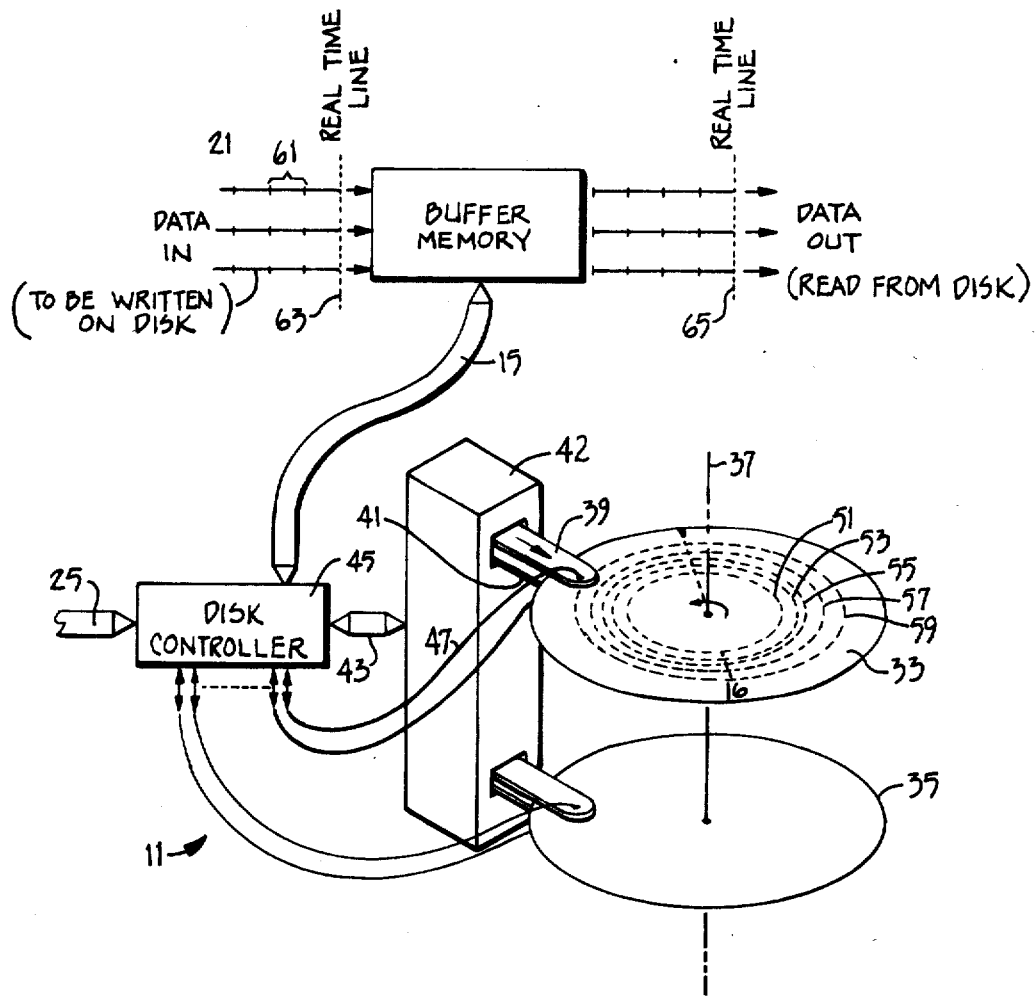
FIG. 2 illustrates added details of the disk system of FIG. 1.

Referring to FIG. 2, the essential components of a fixed disk storage system 11 are illustrated. A plurality of circular disks 33–35 are held concentric with each other and rotated about their common access 37 at a constant high rate of speed. Each disk has a magnetic recording surface on its top and bottom. There are many commercially available disk storage systems that can be utilized, one of which is a standard ten disk system sold by the Control Data Corporation.

Each disk, such as the disk 33, includes a pair of arms 39 and 41 that are moved back and forth across the disk in a radial direction by electromechanical mechanisms 42 in response to control signals on a bus 43 from a disk controlling circuit 45 (disk controller). Each of the arms has a single read/write head at its end, such as at the end of the arm 39, from which or to which a serial stream of data is passed on a single conductor 47 that is connected to the disk controller 45. The data being read from the disk or being written onto the disk is communicated with the buffer memory 13 over the lines 15, while signals controlling the position of the read/write head arms 39 etc. comes to the controller 45 over the control bus 25.

This structure and operation of a disk drive is well known, of course, since they are in extensive use, this summary being provided only as background for explaining the use of such a storage system in carrying out the various aspects of the present invention. The particular commercially available disk drive mentioned above has ten such rotating disks, and therefore twenty recording surfaces, nineteen of which are available for recording data and the twentieth of which contains signals identifying the location of the circular tracks on which data is to be recorded. A few of these tracks 51–59 are shown in the top disk of FIG. 2, data being recorded in the same tracks on every other such disk since all of the read/write head arms are moved together radially inward and outward of the center 37 of rotation of the disk. The same track on each of the nineteen data disk surfaces forms a cylinder. In the specific example being described, there are 807 such cylinders.

A primary characteristic of such a disk type of storage device with which the present invention is concerned is its periods of latency; that is, the periods of time in which the read/write head and disk surface are moving relative to each other from the position of one AU of data to that of another, periods of time when data is not being transferred. The time for accessing an AU of data varies, depending on how far apart the AU is from the position of the last AU accessed on the disk. There is time necessary both for the read/write heads to move from the cylinder of one AU to that of the next AU (seek latency) and for the disk to rotate the beginning sector of the next AU to the heads (rotation latency). In the particular example being described, it takes about one-third disk revolution of time for the heads to move one cylinder, the heads being able to move up to eleven cylinders in one-half revolution and up to 72 cylinders in a full revolution. Of course, any time required for such movements is time the data cannot be read from or written to the disk and thus the efficiency of data transfer is reduced.

The multi-channel data lines 19 and 21 are schematically illustrated in FIG. 2 as real time streams of data that are broken into blocks or allocation units (AU's), such as AU 61 shown in one of the channels for data coming into the buffer memory 13. A real time line 63 shows the AU's for each of the three channels which are at a particular instant of time being written into the buffer memory 13 for temporary storage. Similarly, the three streams of data illustrated for the lines 19 in FIG. 2 that are being read out of the buffer memory 13 are shown relative to a real time line 65 that identifies a portion of the data stream at the time of the snapshot of FIG. 2 that is being presented to data utilization equipment within the source and destination equipment block 17 of FIG. 1. The techniques of the present invention allow data to be written onto the disk simultaneously with reading data from the disk, although one or another of these functions can be performed alone. Each of the channels of data is considered to be an integral data file separate from the others and is so treated, thereby permitting each channel of data to be individually accessed and/or shifted in time with respect to the other channels.

In the specific implementation being described, each track of data recorded on the disk is divided into 32 sectors thereabout. That is, 32 sectors of data may be recovered from the disk system 11 for a single revolution of the disk depending upon which read/write head is activated. Only one such head may be activated at one time in this common type of equipment. The block of data or allocation unit (AU) size is selected to occupy 62 or 63 sectors of data which represents about one-third to one-half second of sound at a 48 KHz. sampling rate. Thus, an AU is sized to be one or two sectors less than two tracks full of data, thus permitting switching between tracks on the same cylinder during the time for rotation of only the one or two sectors, thereby minimizing rotational latency during such switching.

The individual AU's for any particular channel, or all of the channels together, are not recorded in physical sequence on the rotating disks but rather are scattered throughout the disk, a table in computer memory 29 keeping track of the physical disk addresses for the various AU's that need to be put back together when reading the disk to form the continuous stream of data for each channel. Because of seek latency and rotational latency of the disk storage system, scattered storage, as opposed to storing each AU on the disk physically adjacent the next AU in time sequence, tends to greatly increase the expected access time for a single file. The overall data transfer efficiency of the disk system may be viewed as having a maximum data transfer bandwidth that occurs in completely sequential recording where the read/write heads move in order from one cylinder to the other across the disk. But the theoretical maximum bandwidth is reduced when a stream of data is broken up into AU's that are recorded at scattered cylinders because of the latency discussed above.

It would seem, therefore, that scattered storage is undesireable and not to be used in a situation where bandwidth is attempted to be maximized. However, it has been found as part of the present invention that scattered storage actually improves bandwidth overall when multiple files or channels of data are being recorded and retrieved from a disk system wherein the flexibility of being able to access a single file or channel is desired, as well as to shift the relative timing of one file or channel with respect to the others. Scattered storage is highly desireable to permit such separate access and timing shift. Scattered storage is not by itself new since many computer operating systems have utilized it. But the transfer efficiency or bandwidth of those systems is only five to ten percent of the theoretical maximum disk access bandwidth. The technique of the present invention, however, allows operation approaching 80% of the maximum bandwidth.

One of the features of the present invention that contributes to this increase in transfer efficiency is the physical layout of data on the disk. According to a specific implementation, with reference to FIG. 2, alternate disk tracks 51, 55 and 59 begin the recording of each AU at sector zero. The interleaved alternate tracks 53, 57 etc. begin the AU's recorded therein at sector 16, 180 degrees displaced from the beginning zero sector of adjacent tracks. This has the significant advantage of being able to move the read/write heads to a new cylinder and begin reading data therefrom within one-half revolution of the track where the reading of data in another AU has been concluded. The heads of the specific equipment previously described can move up to eleven cylinders in either direction within one-half revolution. The normal technique as used by others is to begin recording of the AU's at the zero sector of each track, thus requiring a minimum of one revolution of wasted time where no reading can take place when the head must move from one track to another. Of course, the computer memory 29 keeps track of the beginning sector for each of the different recording tracks on the disks.

The static technique of physical data orientation on the disk just described is simple and easy to utilize in software systems. However, an even greater efficiency is possible, but more complex software is therefore necessary to utilize, if more than two different starting sectors are chosen. The generality may be expressed by the following mathematical relationship which gives the starting sector for a given disk data track:

$$(S/N)(\text{cyl. modulo } N),$$

where S is the total number of sectors around one track, N being the number of different rotational starting sectors desired to be included, and where "cyl. modulo N" is an integer remainder resulting from dividing a particular track number, whose starting sector is to be determined, by the number N. Thus, it can be seen, that the case described with respect to FIG. 2 satisfies this expression where $N=2$ and $S=32$. That is, the initial starting sector of one track is zero, the next is 16, the next is zero, and so on completely across the disk. For another example, if N is chosen to be 4, the starting sector of track zero is zero, that of track 1 is 8, that of track 2 is 16, that of track 3 is 24 and that of track 4 is zero, thus repeating the pattern in that manner across the disk. It is not absolutely necessary, but certainly convenient from a software standpoint, to have the starting sectors vary in a periodic fashion across the disk. Some type of random allocation could also be utilized with the same beneficial results of increased bandwidth of disk access.

Figure 5:
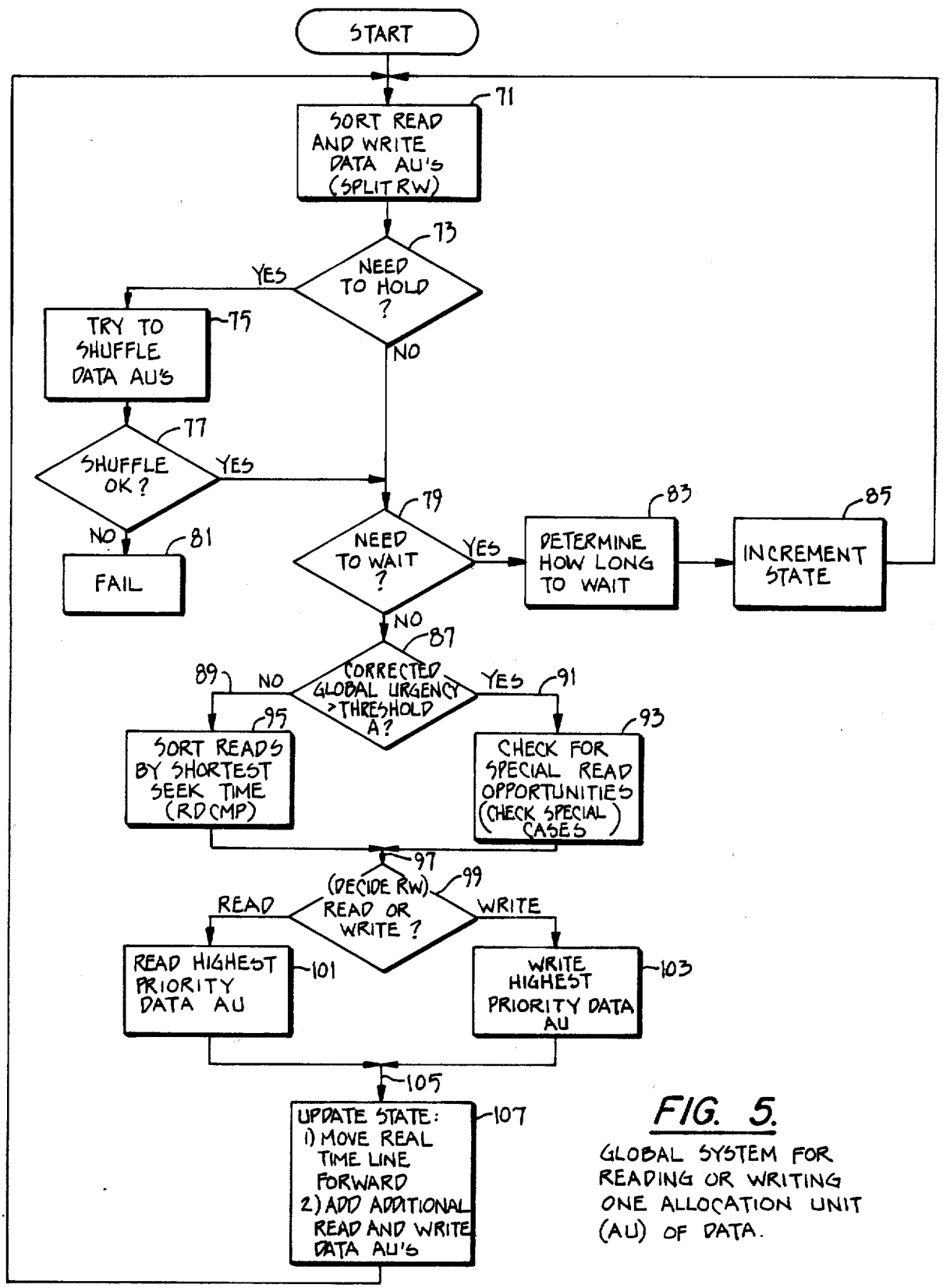
FIG. 5 is an overall flow diagram showing implementation of a method for scheduling the order of reading and writing blocks of data between the disk system and the buffer memory.

FIG. 5 shows in the form of a flow chart the method steps involved in deciding which AU to access and read from the disk at a particular point in time in order to maximize the disk bandwidth in light of the various constraints imposed. The method illustrated in FIG. 5, as supported by the more detailed flow diagrams of FIGS. 6-9 for portions of the overall method illustrated in FIG. 5, decides for which of the channels (three in our example) the next AU in order will be read into the buffer memory 13 from the disk system 11, and further whether an AU of incoming data stored in the buffer memory 13 should be written onto the disk instead of reading one. This in effect is a method of scheduling the read/write head movements between the data cylinders of the rotating disks in an optimum manner.

The goal of this system is to maximize the data transfer rate to and from the disk system in the environment of significant constraints. The transfer efficiency could be made very high by simply telling the read/write head to access the next AU among a number of AU's to be read in the near future, whose access or seek time of the heads is the least. But because of the scattered storage, this could result in the number of AU's for each of the separate channels or files within the buffer memory 13 becoming significantly unbalanced. One significant constraint is the finite storage capacity of the buffer memory 13. A constraint that operates in a similar manner is the desire in most cases that the reading and writing be done in real time, although the techniques of the present invention will work equally well where real time operation is not desired. If the buffer memory 13 becomes completely full, for example, while there is at the same time no data for one of the channels, then the system will necessarily abort or the data will simply have to be omitted from one of the channels, a condition which cannot be permitted.

Therefore, one goal of the disk head scheduling method or algorithm of FIG. 5 and its supporting figures is to strike a balance between reading the scattered AU's in an order that minimizes the access time against the need to maintain within a limited buffer memory 14 a fairly balanced number of AU's for each of the channels being read. This method will also look for opportunities to write an AU of recently acquired data from the buffer memory 13 into the system in order to keep the buffer memory from getting too full.

The scheduling method (algorithm) discussed below with respect to FIGS. 5-9 responds to a user designated order of the AU's to be received by the destination equipment 17 and then produces a transfer schedule in the form of disk read and write commands that specifies the order in which the AU's are to be read from or written onto the disk in accordance with the considerations discussed above for a high transfer efficiency. This transfer schedule is first developed by the computer 23 and subsequently data is transferred in accordance with it, either immediately or some time later. The scheduling method simulates the disk, AU locations, buffer and real time from information stored in the computer memory 29 in building the transfer schedule.

Figure 3A:
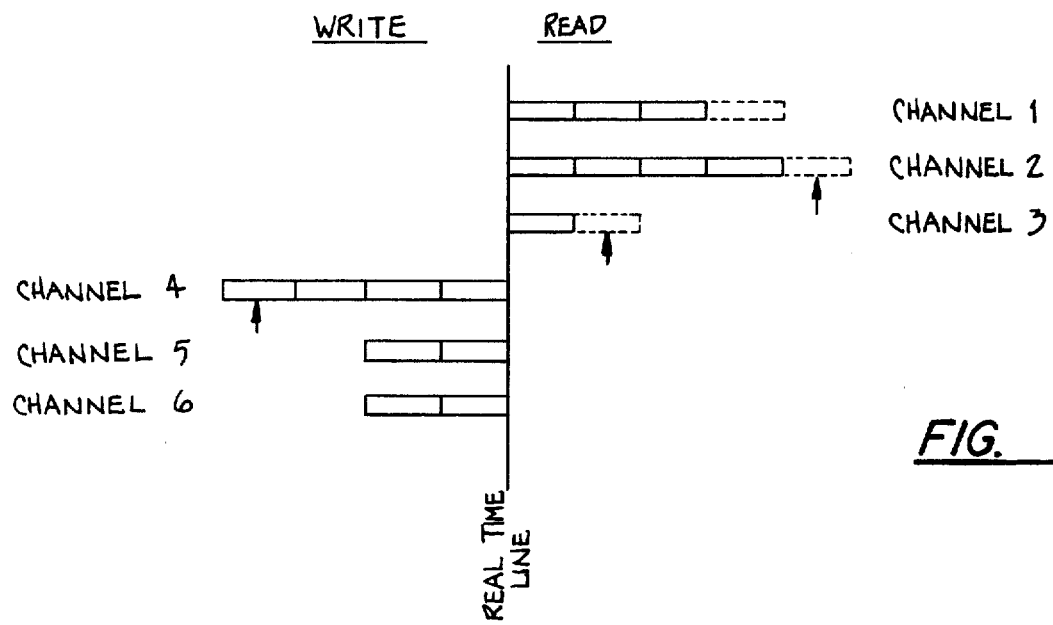
FIGS. 3A and 3B are timing diagrams that illustrate the operation of the various aspects of the present invention.
Figure 3B:
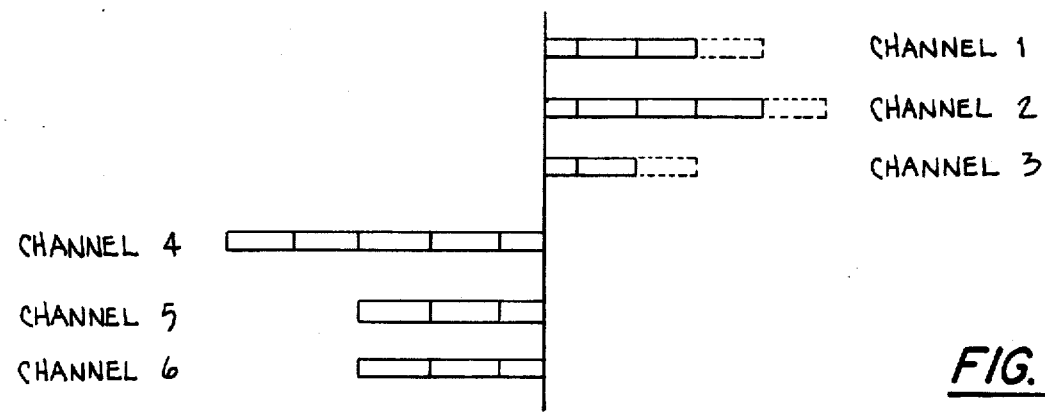

Before describing the method of FIG. 5 in detail, reference is made to FIG. 3A which shows the number of AU's for each of the three read channels and three write channels that exist in a simulation of the buffer memory 13 at a particular instant of time during the process of developing the disk control transfer schedule. The solid rectangles show AU's in the buffer and those in dotted outline show AU's that are potentially readable next in order from the disk system. The method to be described with respect to FIG. 5 is to decide in the first instance whether the next in order AU for channels 1, 2 or 3 will be read from the disk memory system. It is assumed in this example that the next AU in order for channel 2 would be accessable by the read heads in the least amount of time, but as can be seen this decision would result in practically running out of data for channel 3. Therefore, the likely decision is to read the next AU in order for channel 3, and this is shown as having been done in a next instant of time that is illustrated in FIG. 3B.

However, as a part of the process that decides the priority AU to be read from the disk, the method to be discussed with respect to FIG. 5 also examines whether it is preferable to write an incoming data AU stored in the buffer memory 13 onto the disk. If it is decided to perform a write operation, rather than read, the selected write AU is the oldest one of the fullest channel 4 in the example of FIG. 3A. It can be most advantageous to decide to write that AU on the disk rather than reading anything in a particular cycle, in order to make additional capacity available from the limited capacity buffer memory 13.

Referring to FIG. 5, one such decision cycle is illustrated in full. A first step 71 of the method sorts both the candidate AU's to be scheduled for reading from the disk into the buffer, and those for writing onto the disk from the buffer, into an initial priority listing. This step, illustrated in more detail in FIG. 6, identifies the next in order AU to be scheduled to be read for each channel, shown in dotted outline in FIG. 3A previously discussed. The AU to be read for the channel that will have the least number of buffered AU's, channel 3 in the example of FIG. 3A, is identified by a software pointer. Also, as part of the step 71, the AU within the buffer 13 is scheduled as the highest priority to be written onto the disk is identified, should it be decided to designate a write rather than a read during this cycle, that being the left most AU of channel 4 of FIG. 3A.

Figure 4A:
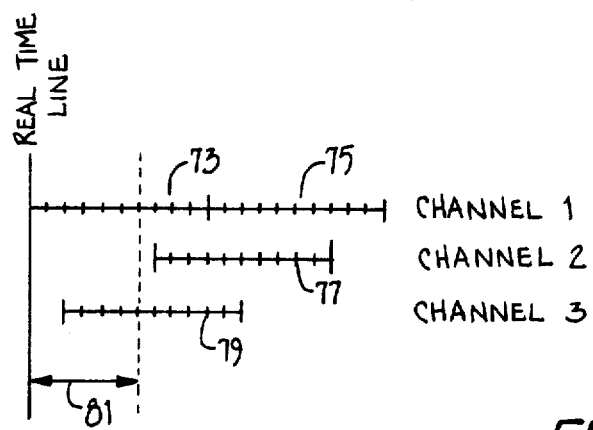
FIGS. 4A and 4B are further timing diagrams that illustrate operation of the present invention.
Figure 4B:
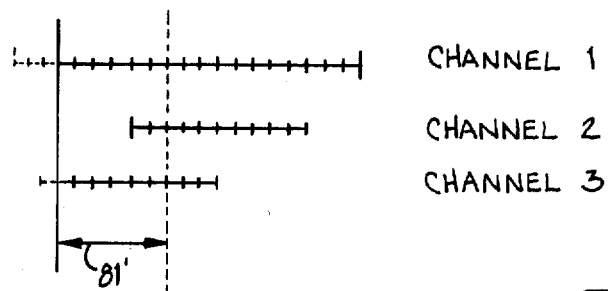

The AU's are kept track of in the computer memory 29 in groups of a plurality of them, each such group called a file transfer item (FTI). FIG. 4A illustrates four such FTI's 73 and 75, for channel 1, FTI 77 for channel 2 and 79 for channel 3. At the particular point of the scheduling cycle illustrated in FIG. 4A, FTI's 73 and 79 are within a simulated window of time 81 and the AU's thereof are those that are sorted and upon which the initial selection is made by the method step 71 of FIG. 5 of the few candidate AU's to be scheduled for writing or reading during this cycle. Several reading or writing cycles later, as shown in FIG. 4B, a simulated real time line, and thus the window 81, has been moved with respect to the data which is scheduled to be read from the disk. Any FTI that is within the window 81 is considered an active file transfer item (AFTI).

Referring again to FIG. 5, a next step 73 of the method is to investigate whether the situation is about to exist where there will be no AU for one or more read channels within the buffer 13. If that is the case, then an attempt is made to designate a shuffle of the read data AU's on the disks, as indicated by step 75. Shuffling will be successful if a cylinder can be found for the emptiest channel's next AU, which cylinder is much closer to the disk head than currently, thereby greatly reducing the access time to reach it. If successful, as illustrated by step 77, the process is returned to the next step 79. However, if it is impossible to correct the situation, the method fails as indicated by the block 81 and the system aborts.

If step 73 does not detect the situation where one of the read channels within the simulated buffer memory is empty or about to be empty, the method proceeds to the next step 79 which asks whether the transfer schedule being developed should include a delay of a few cycles. It is possible that the transfers can get too far ahead and fill up the buffer 13 with AU's that have just been read from the disk so that it is necessary to wait a few cycles until some of those AU's are transferred to the utilization equipment 17. If a condition is about to be set up where there will be no buffer space to accept another AU from the disk and if there will be nothing in the buffer to be written onto the disk, the system then asks, according to a step 83, how long a delay is necessary before attempting another read or write. A step 85 then increments the simulated time by that amount of necessary delay. A period of waiting allows the buffer memory 13 to have some data removed to the data utilizing equipment 17, thus freeing up buffer memory 13 to accept further data from the disk system 11.

Figure 7:
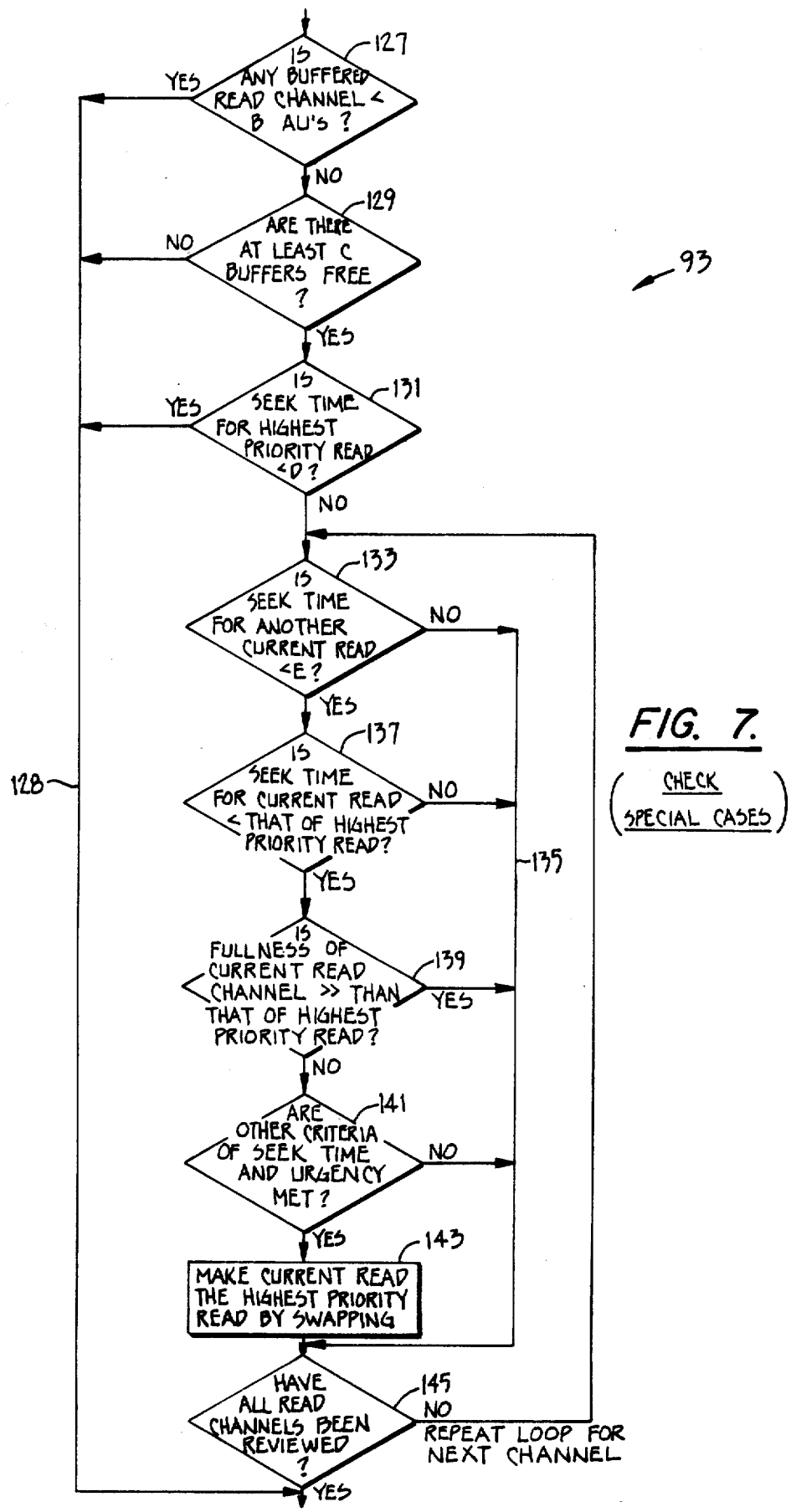

If there is neither a need to hold nor a need to wait, a next step 87 decides whether to schedule the heads to move to access the cylinder which contains the next AU to be read for any channel that is the quickest to reach, thus following a path 89, or whether because of an unbalance in the number of AU's in the buffer 13 for the various channels, a path 91 should be followed. The path 91 will cause a priority read to be made in the channel having the fewest AU's in the buffer 13, channel 3 in the example of FIG. 3A. If this path is followed, a further optimization is made by a method step 93, the details of which are illustrated in FIG. 7. If the path 89 is taken, the AU of channel 2, in the illustrative example of FIG. 3A, would be read since it is physically located on a disk cylinder closest to where the head is located when the decision of the next read AU is being made, this step being illustrated by the block 95 of FIG. 5. The manner in which the decision illustrated by block 87 is made is a principal feature of one aspect of the present invention, and is described in detail below.

At the point 97, a decision has been made as to which of the files or channels, a total of three in the specific example being described, is designated as the priority channel for receiving the next AU read from the disk memory 11. A decision 99 is then made as to wheter to read this highest priority AU from the disk, in accordance with a method 101, or rather to write the highest priority data AU from the buffer to the disk system, in accordance with a step 103. If it has chosen to write a data AU, in the example of FIG. 3A, the earliest AU marked with an arrow of the fullest channel 4 would be written. The method 99 which leads to the read or write decision is explained later in detail with respect to FIGS. 8 and 9.

At a point 105 of the selection method of FIG. 5, the decision has been made as to whether to designate that an AU be read from or written onto a disk, and a particular single AU is scheduled for such an operation. Steps represented by a block 107 then update the system in preparation for making the next similar decision. The simulated real time line is moved forward in determining which data AU's are to be considered during the next selection cycle, as well as identifying the new read/write head cylinder location. The selection process illustrated generally in FIG. 5 is then repeated for this new set of circumstances.

As previously mentioned, the decision indicated by method step 87 is quite important to the process illustrated in FIG. 5 and the quantities upon which that decision is made are initially calculated as part of the method step 71. The method step 71 is shown in detail in FIG. 6. A loop of calculations is first performed for each of the read and write channels. A first step 111 effectively counts the amount of data that will be stored at this given instant of time in the buffer 13 for one channel. An accumulator, which starts at zero, is incremented by one if the amount of data falls below a particular threshold, which can be measured in either disk revolution time or number of AU's in the buffer. Thus, the resulting number in the accumulator after all of the channels have been reviewed is going to depend on the number of channels whose buffered data is less than this threshold.

A next step 113 is to take the mathematical reciprocal of the amount of data, commonly measured in number of AU's, in the channel. This reciprocal is added to a separate accumulator which starts at zero. The result, after all channels are reviewed, is a global urgency measure number in the separate accumulator that is large if the channels are generally empty, and small if they are large.

A next step 115 is to count the number of read or write AU's that will be in the buffers for the channel being reviewed, and then ask, as represented by block 117, whether those items have been calculated for each channel. If not, the quantities calculated by the steps 111, 113 and 115 are again calculated for the next channel.

When all of the channels have been reviewed, a step 119 develops a single quantity which is compared with a threshold A in the decision 87 of the method of FIG. 5 for making a single read or write calculation. The global urgency measured in the accumulator as a result of applying step 113 for each channel is independent of the number of channels employed. The same threshold A is used in the step 87 of FIG. 5 no matter how many channels are utilized; and the method of calculating the global urgency according to step 113 of FIG. 6 remains the same. Although the calculated number will be somewhat higher as the number of channels increases, this automatically provides a necessary safeguard since less variation in the number of AU's in each channel can be permitted as the number of channels goes up. That is, the amount of unbalance in the channels must be maintained within narrower limits as the number of channels goes up since the larger the number of channels, the greater the chance of running into a difficulty which will cause the read buffered data to run out for one channel.

But since it is important to note any potential difficulty with respect to one channel, which might not be reflected by the global urgency measure, the accumulated local critical count developed by the calculation step 111 for each channel is then used to adjust upward the global urgency in step 119 if necessary to have a realistic number to compare with a single threshold A in accordance with the step 87 of FIG. 5. As an example, if the local critical count is less than two (that is, fewer than two channels have an amount of data less than the threshold), no adjustment is made in the global urgency. However, if the local critical count is equal to or greater than two (two or more channels have little buffered data), a small fixed constant is added to the global urgency. The resulting quantity is compared to threshold A is referred herein as the "urgency".

Figure 6:
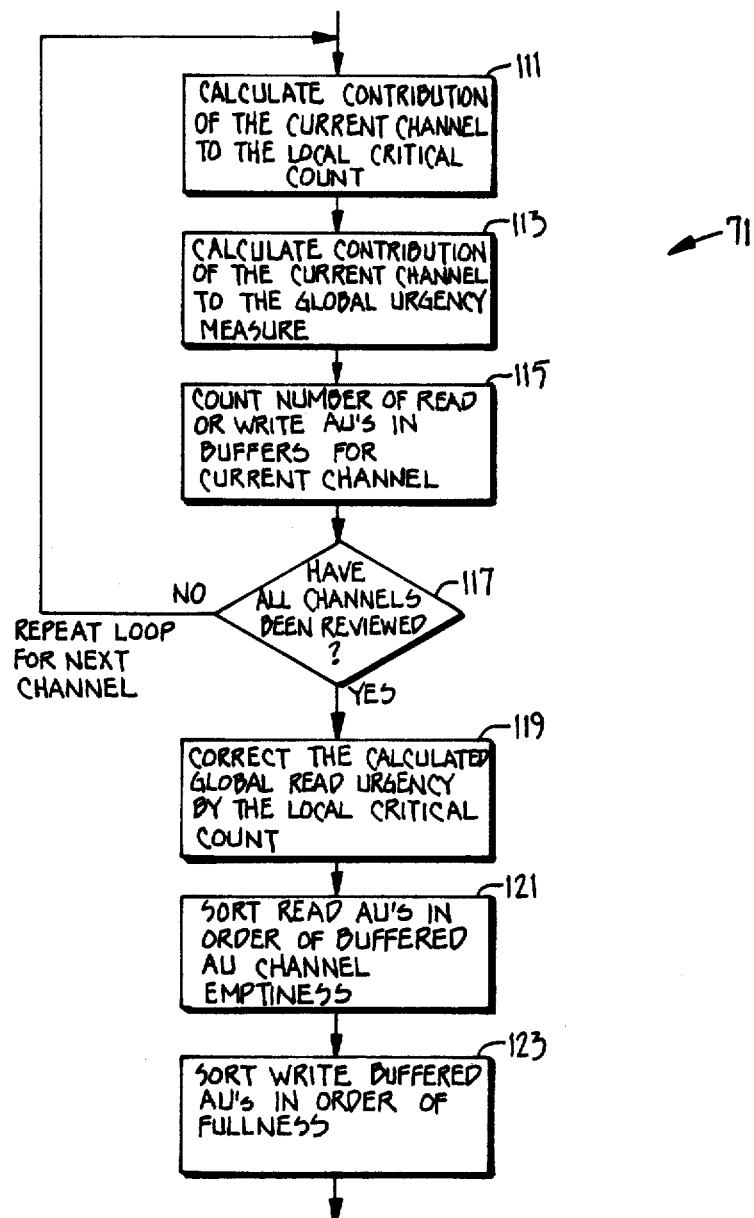
FIGS. 6, 7 and 8 show in an expanded form three different steps of the method illustrated in FIG. 5.

Alternatively, separate thresholds could be set for the local critical count and global urgency measure with which to compare the values accumulated by the respective steps 111 and 113, but it is more convenient to have a single threshold A, and thus a single comparison 87, by adjusting the number to be compared through a combination of the local critical count in the global urgency measure in the step 119 of FIG. 6.

In either of these alternatives specific comparison techniques, the global and local features of each of the single channels described above are taken into account in determining whether to do the read with the least access time, according to step 95 of FIG. 5, or read the AU from disk which will fill in the emptiest buffered channel, after checking for the existence of special circumstances in the step 93.

Referring again to FIG. 6, after the urgency is determined by step 119, a step 121 identifies the read channel which has the least amount of data in the simulated buffer (and thus will so have in the buffer 13 when the transfer schedule is executed), channel 3 in the example of FIG. 3A. This thus provides a default selection which is implemented, unless changed by subsequent processing to be described.

A step 123, conversely, identifies the channel that will have the most write AU's in the buffer memory 13 if it is later decided to do a write, the oldest AU for the channel identified by the step 123 to then be written to disk.

Once the decision in FIG. 5 has followed the path 91 to select the read to promote the balance of data for the various channels, the matter is again investigated in step 93, as illustrated in detail in FIG. 7, to see whether the next in order data AU for some other channel would be more optimum to read rather than the emptiest channel identified in the step 123 of FIG. 6.

Referring to FIG. 7, a number of decisions are made in determining whether to disturb this default balanced read selection. A decision 127 initially made depends upon whether any channel has less than a certain threshold B of buffered read data, measured in AU's. If so, the default read channel determined by step 123 of FIG. 6 is not disturbed, the process moving directly by a path 128 to the end block 93 processing.

However, if no read channel is that empty in the buffer, a step 129 then examines whether there are at least a certain number C of buffers that are free. If there are, processing proceeds to a step 131. If not, no further examination is made but rather the default read channel is maintained by the bypass path 128. The step 131 allows the chosen default read channel to remain if the seek time to read the next AU for the channel is less than a small threshold D. Since the goal of the processing 93 illustrated in FIG. 7 is to reduce the seek time to reading the next AU from the disk if certain conditions of buffered data balance are satisfied, the condition 131 allows the inquiry to be terminated once it is discovered that the seek time for the priority data read AU is already extremely low. Under these conditions, the chances of improving that are low and so the inquiry is carried no further; the default read is selected to be performed at this place in the schedule.

However, if the seek time is greater than the threshold D, the processing goes into a loop wherein one of the other data channels is compared with the default data read channel selected by the step 123 of FIG. 6. If this other channel is determined by this loop to be a better candidate for the next read, then it is substituted as the priority read for the default read previously determined, and the process is again repeated with yet another channel, comparing it to the new priority read channel. However, if the second channel turns out not to be any better than the priority read channel, then the process is repeated by comparing the third channel with the default priority read channel, and so forth.

Referring to this two channel comparison loop, a step 133 determines whether the read of the new channel being compared with the priority channel has a disk access time of less than a threshold E. If not, then that channel's next read AU cannot be a candidate for replacing the default value and the process is ended through a path 135.

If the seek time of the second channel next read AU is less than the threshold E, however, a critical determination 137 is made as to whether the seek time of the second channel next read AU is less than that of the highest priority default read. If not, of course, there is no purpose in making any further inquiries, but if it is shorter, it is next determined whether the amount of data in the buffer 13 for the second read channel is much greater than that of the highest priority read channel. If so, then it is not desired to further that unbalance but rather the priority default read channel maintains its priority. It may further be desireable to require other combinations of reduced seek time and balance before changing the priority read to something else, as indicated by the step 141.

If all of these criteria are met for the second channel data AU with respect to the default priority data AU, a step 143 will cause the second channel data AU to be designated as the priority rather than the initial default value being so determined. The process is then repeated comparing yet another read channel if a step 145 determines that not all have been compared. The ending result is either that the read channel identified in step 123 of FIG. 6 remains or that one having somewhat less access time has been substituted for it as the new priority read channel data AU.

To summarize how the determination is made in the step 93 of FIG. 5, as illustrated in detail in FIG. 7, fits into the overall picture, it will be noted that point 97 of FIG. 5 a decision has already been made in step 87 whether the path 89 is to be followed and the priority read determined by whichever one has the shortest access time, according to step 95, or alternatively by the path 91 that determines the priority read data AU which tends to maintain a balanced condition among the buffered information for each channel, subject to whatever adjustment may be made in the step 93 because of particular circumstances.

Figure 8:
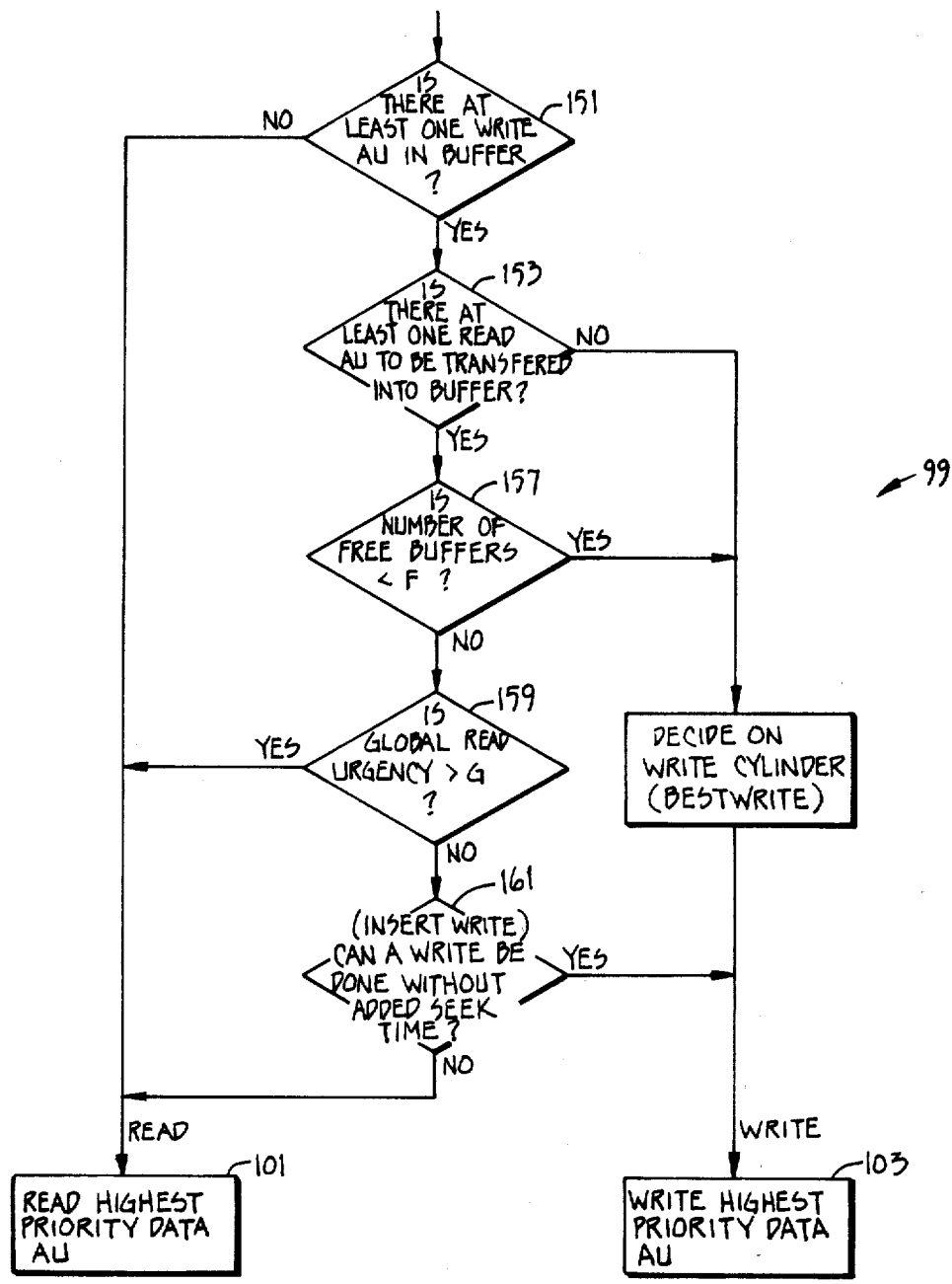

The decision in the step 99 is then whether to cause that determined channel read data AU to be read or whether it is more appropriate to write an AU onto an empty portion of the disk, in the case where both reading and writing is occuring at the same time. FIG. 8 illustrates the criteria in making that decision. A step 151 will cause such a read if there are no AU's within the buffer 13 to be written onto the disk. If there is at least one AU to be written, a step 153 then asks whether there is a read AU scheduled to be transferred from the disk into the buffer. If not, a step 155 is performed to decide where the AU shall be written, generally always being the cylinder that has the shortest access time from where the heads are currently located.

However, if there is some reading to be done, a step 157 then looks to the amount of free buffer memory 13. If the number of free buffers is less than some threshold F, then the writing step 155 is performed since it is of paramount importance to clear the buffer memory 13 to make room for additional read AU's. If the number of buffers is greater than the threshold F, then writing is not so critical and a next decision 159 is made as to whether the global read urgency is greater than a threshold G. If so, then reading is accomplished since a high urgency represents an unbalanced situation among the read channels in the buffer 13. The threshold G is necessarily made to be slightly greater than the threshold A used in the initial decision step 87.

If the urgency is not high, an opportunity is given by a step 161 to determine whether a data AU within the buffer 13 can be written on a blank portion of a disk cylinder without adding any additional access time. If so, the highest priority data AU is written at that location where no additional time is necessary to do so. If not, then a read is accomplished according to step 101.

Figure 9:
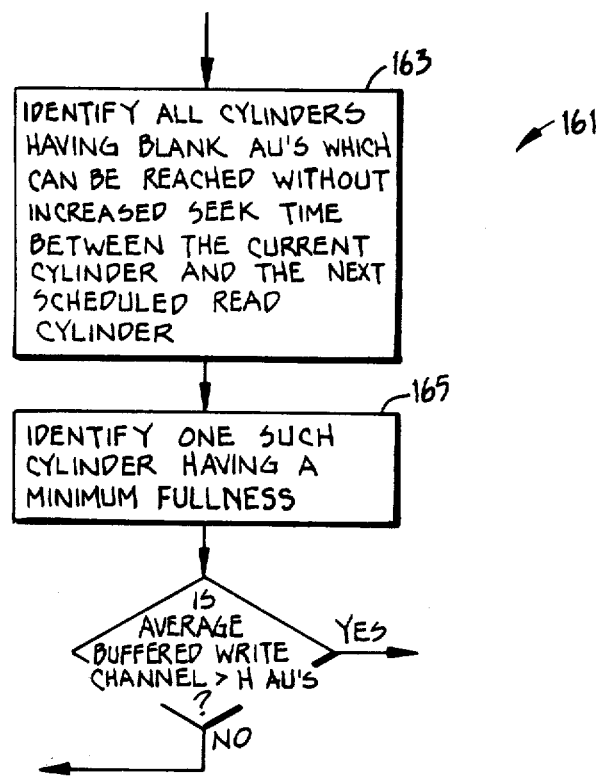
FIG. 9 shows the method steps of one of the blocks of FIG. 8.

Referring to FIG. 9, the main considerations of the step 161 are shown in diagramatic form. A step 163 identifies all disk cylinders having space to write an AU and which can be accessed without increasing the disk head access time as it proceeds from its existing location to the cylinder containing the next data AU to be read. If it requires anything more than one-half revolution for the head to move from its existing cylinder to that containing the next designated priority read AU, there is a potential of having a blank space on a cylinder inbetween that could accept a write AU. For example, if a particular scheduled read requires one full revolution to access and there is a blank therebetween one-half revolution from each, that write and the next read can be done with the same total one revolution of access time.

Once those possibilities are identified, a step 165 will select one of those cylinders for a write. In order to maintain the disk cylinders somewhat physically balanced with data AU's, one of the possible cylinders for writing without additional access time which has the least amount of data on it will be selected by the step 165. If the number of buffered AU's in the buffer memory 13 for that particular channel from which the oldest is designated to be the highest priority write data AU, is greater than a threshold H, the AU will be written. If not, it shows that there are not that many AU's in the buffer memory 13 waiting to be written onto the disk and the reading 101 will be selected rather than the writing 103.

An attached Appendix gives in C language source code a computer program to implement the method described with respect to the Figures. The title given to various subroutines in the attached Appendix that are discussed with respect to the drawings are also identified in the respective drawing blocks, for easy correlation.

Although a specific preferred embodiment utilizing the various aspects of the present invention has been described, it will be understood that Applicant is not restricted to the particular embodiments shown but rather is entitled to the full protection of his invention within the scope of the appended claims.

APPENDIX

```
/* xsc()'s version of the activeFTI struct. */
struct xscafti {
        struct FTI *itsfti;
        char trxnum;
        char action;
        char dsk;
        char sktm;
/* buffer state for scheduling */
        long CBtime;
        long fullness;
        char fullbuffs;
        char state;
#define aftiUNUSED      0
#define aftiLOADED      1
#define aftiACTIVE      2
#define aftiDRAIN       3
/* information about AUs in the current FTI */
        short AUsleft;                  /* down counter */
        /* for reads, nextAU == *nextAUp except for punchins */
        /* for writes, nextAU is the logical AU number in the file */
        short nextAU;
        short *nextAUp;                 /* points into AUlist[] */
        short *AUlist;                  /* obtained from SFDFS */
/* information used for scheduling decisions */
        char priority;
        char nAUs;
        long imbalance;
        char fakeseek;                  /* flags punchin afti's */
        char fakecount;                 /* a counter when fakeseek == TRUE */
};

struct xscstate {
        short headposn[MAXDISKS];       /* must remember where we are */
        short curdisk;
        struct filesystem *curfs;
        short nfreebuffs;               /* so as not to get out of line */
        short nactive;
        short AUsLastTime;              /* for overlapped seek detection */
        short xfercnt;                  /* ditto */
        short lastref[MAXDISKS];        /* and ditto */
};

/* disk ops which are useful to us here (because they get into SXLE's) */
#define DISKSEEK  040
#define DISKWRITE 041
#define DISKREAD  060

/* x is supposed to be a (struct xscafti *) */
#define READING(x) (x)->action == DISKREAD
define WRITING(x) (x)->action == DISKWRITE /* x is supposed to be a short from an AUlist */
define CYLINDER(x) (int)((x) & 01777)
```

```c
#define SURFACE(x) (int)(((x) >> 10) & 037)

#define CLIXPERBUFF (63*128)
#define CLIXOFBULK 129024.0    /* 16 buffers from 1 memory board */
#define MAX_DISK_BW 680000.0   /* in clix. Rough: 85% of 800000 */

/*
 * The shuffle list consists of items which associate a logical AU
 * number in a file with a new AU, which is to replace the current
 * one.  These list items are ready for consumption by a special
 * routine designed into SFDFS for the purpose.
 */
struct shuffle {
        struct shuffle *next;
        struct openfile *fileid;
        short where;           /* logical AU number */
        short newau;
};

/* Stuff supplied by caller */
int holdsallowed;      /* a flag, usually off.  Says can fall out of RT */
char xsc_fails;
char iochans_available;
struct FTI *inputlist;         /* the XSched to compile */

/* Results returned by xsc() */
struct SXLP *firstpage;        /* the resulting schedule */
struct SXLP *preloadpage;      /* optl -- never for resched */
struct shuffle *shufflelist;   /* optl -- never for resched */
struct lkSXLE *upgSxles;       /* accumulates non-paginated SXLE's */

/*
 * Stuff used by for scheduling, and initialized by initxsc(), or
 * by ??? in the case of rescheduling.  aftitbl[] is the simulated
 * version of the gadget of same name in the diskState struct used
 * by the RT drivers.  globl_xscstatebuff is what xscstatebuff points
 * to except sometimes in needToHold() (which see if interested).
 */
struct xscafti aftitbl[FTIMAX];
struct xscstate globl_xscstatebuff;
struct xscstate *xscstatebuff;

/* stuff used by putaction() and friends */
struct lkSXLE {
        struct lkSXLE *next;
        struct SXLE s;
};
struct lkSXLE *preloadproto;
int preloadsxlecount;

/* routines */
long rotsToClix();
float clixToRots();
long getxferclix();

/*
 * The transfer schedule compiler generates a scheduled transfer list (SXL)
 * from an input transfer schedule (XSched).  It starts from an initial
 * state which is built by its caller.  It is called before a run-thru
 * and during a run-thru after a button-enabled file transfer is enabled.
 */ include <fmx.h>
include <drivers.h>
```

```c
#include <sfdfs.h>
#include <xsc.h>

/* These serve for separating read/write and sorting on priority, etc. */
struct xscafti *aftiReads[FTIMAX], *aftiWrites[FTIMAX];
int nreads, ndrainingreads, nloadedreads, nwrites, ndrainingwrites;
int totalReadAUs, nextbbx, minAUsNeeded;

/* communication among local routines */
long minfullness, maxwfullness;
static float urgency, threshold1, avgwfullness;
static long minwtimeleft;
static char maxwbuffs;
static char ncritical;
struct SXLP *curpage;
long nextentrytime;

int holdcnt;              /* # of times holding happens */
long holdclix;
long holdclixtot;
int waitclix;
int waitclixtot;
long simclix;             /* total rots in simulated time so far */
long dbgontime;           /* set from debugger to turn on dbg flag */

/* the following data collected from the disk itself */
#ifdef AU62
short seekdists[8] =                    /* the real unadjusted data */
    {0, 11, 72, 197, 372, 559, 744, 823};
#else
short seekdists[8] =            /* this version adjusted for slow cntlr */
    {1, 10, 71, 196, 371, 558, 743, MAXCYL};
endif /* forward declarations */
int rdcmp(), fullcmp();

/*
 * xsc() mostly returns results thru the data objects enumerated above.
 * It also returns FALSE if infeasible, TRUE otherwise.
 * If successful, it returns a schedule, and shuffle list (if needed).
 * It tries to minimize shuffles.  This is interpreted to mean that if
 * holds are allowed, shuffling will never be done.
 */
xsc(dsp, firsttime)
{
int i;
struct xscafti *chosen;

xsc_fails = FALSE;
        if(firsttime) {
                firstpage = NIL;
                preloadpage = NIL;
                shufflelist = NIL;
                curpage = NIL;
                if(not (checkFeasible(dsp) && initxsc(dsp)))
                        return FALSE;
        } for(;;) {
                if(dbgontime != 0 && simclix > dbgontime)
                        dbgflag.flagword |= 02000;
```

```
		if(xsc_fails) {
			decircularize_preloadproto();
			xscCleanup();
			return FALSE;
		}
		if(splitrw() == 0) {			/* done */
			xscDoneFixup(firsttime);
			return TRUE;
		}
		i = needToHold();		/* returns -1 .. nreads */
		if(i == 0 && (not holdsallowed)) {
			xsc_fails = TRUE;
			continue;
		}
		if(i > 0 && firsttime && tryToShuffle(i)) {
			continue;			/* try that again */
		}
		if(needToWait()) {			/* sets waitclix if true */
			incrtime(waitclix);
			waitclixtot += waitclix;
			continue;
		}
		qsort(aftiReads, nreads, sizeof(struct xscafti *), rdcmp);
		if(dbgXSC) {
			printf("after rdcmp sort...\n");
			prxscstate(1, TRUE);
		}
		checkSpecialCases();	/* local strategy may override global */
		chosen = decideRW() ? aftiReads[0] : aftiWrites[0];
		putAction(chosen);			/* must be called first! */
		stepstate(xscstatebuff, chosen, chosen->nAUs);
		stepaftis(chosen);
	}
}

/*
 * From current state, fills aftiReads[] and aftiWrites[].
 * Calculates urgency and suchlike as it goes.  Both arrays are
 * sorted on fullness.  This is important since needToHold() depends
 * on it.  Returns 0 if all xfers are finished, 1 otherwise.
 */
splitrw()
{
register struct xscafti *xap, **nxtrd, **nxtwrt;
struct xscafti *xaplim;
register long f, avg;
long time;
float ff;
int count;

ncritical = 0;
	nextbbx = CLIX_PER_AU;
	avgwfullness = 0;
	maxwfullness = 0;
	minwtimeleft = 5000000;
	maxwbuffs = 0;
	minfullness = 5000000;
	urgency = 0;
	avg = 0;
	ndrainingwrites = 0;
	ndrainingreads = 0;
	nloadedreads = 0;
	totalReadAUs = 0;
	minAUsNeeded = 2;
	threshold1 = 0.175;
	nxtrd = aftiReads;
```

```
            nxtwrt = aftiWrites;
            xaplim = aftitbl + FTIMAX;
            for(xap = aftitbl, count = 0; xap < xaplim; ++xap) {
                    if(xap->state == aftiUNUSED)
                            continue;
                    ++count;
                    if(READING(xap)) {
                            f = xap->fullness;
                            if(f < minfullness)
                                    minfullness = f;
                            if(xap->state == aftiLOADED)
                                    ++nloadedreads;
                            else if(xap->CBtime != 0 && nextbbx > xap->CBtime)
                                    nextbbx = xap->CBtime;
                            if(xap->state == aftiDRAIN)
                                    continue;
                            totalReadAUs += xap->AUsleft;
                            if(xap->nAUs > 2)
                                    threshold1 = 0.145;
                            if(xap->nAUs < 2)
                                    minAUsNeeded = 1;
                            if(f < rotsToClix(18.0)) ++ncritical;
                            xap->sktm = seektime(xscstatebuff, xap);
                            avg += f;
                            ff = clixToRots(f);
                            if(ff == 0) ff = 1;
                            urgency += 1/ff;
                            *nxtrd++ = xap;
                    } else /* if(xap->fullbuffs >= 2) */ {
                            if(xap->CBtime != 0 && nextbbx > xap->CBtime)
                                    nextbbx = xap->CBtime;
                            if(xap->state == aftiDRAIN)
                                    ++ndrainingwrites;
                            f = xap->fullness;
                            avgwfullness += f;
                            if(maxwfullness < f)
                                    maxwfullness = f;
                            if(xap->fullbuffs > maxwbuffs)
                                    maxwbuffs = xap->fullbuffs;
                            time = xap->itsfti->end.last - simclix;
                            if(time < minwtimeleft)
                                    minwtimeleft = time;
                            *nxtwrt++ = xap;
                    }
            }
            nreads = nxtrd - aftiReads;
            nwrites = nxtwrt - aftiWrites;

/* another pass to put draining reads at end of aftiReads */
            for(xap = aftitbl; xap < xaplim; ++xap) {
                    if(xap->state == aftiDRAIN && READING(xap)) {
                            ++ndrainingreads;
                            *nxtrd++ = xap;
                    }
            }
            if(ncritical > 1)
                    urgency += .03;             /* klugola */

/* 2. compute imbalance factors */ if(count == 0)
                    return nextentrytime != -1L;
            if(nreads != 0) {                   /* compute imbalances */
                    avg /= nreads;
                    for(nxtrd = aftiReads; nxtrd < &aftiReads[nreads]; ++nxtrd)
                            (*nxtrd)->imbalance = (*nxtrd)->fullness - avg;
            }
```

```
        if(nwrites != 0)
                avgwfullness /= nwrites * CLIX_PER_AU;

/* 3. sort both arrays on fullness */ qsort(aftiReads, nreads, sizeof(struct xscafti *), fullcmp);
        qsort(aftiWrites, nwrites, sizeof(struct xscafti *), fullcmp);

return 1;
}

/*
 * Compare fullness for qsort.  Write files are sorted fullest first
 * while read files are sorted fullest last.
 */
fullcmp(ap, bp)
struct xscafti **ap, **bp;
{
register long a, b;
register i;

a = (*ap)->fullness;
        b = (*bp)->fullness;
        if(a < b) i = -1;
        else if(a > b) i = 1;
        else i = 0;
        return READING((*ap)) ? i : -i;
}

/*
 * This is the main comparison routine, called by qsort(), for
 * scheduling reads.  It goes thru a number of steps, outlined below.
 */
rdcmp(e1p, e2p)
struct xscafti **e1p, **e2p;
{
register struct xscafti *e1, *e2;
long b1, b2, bdiff;
int d1, d2;

e1 = *e1p;
        e2 = *e2p;
        if(e1->nAUs == 0) return 1;
        if(e2->nAUs == 0) return -1;

/* special treatment when both afti's are preloading */
        if(e1->state == aftiLOADED && e2->state == aftiLOADED) {
                if(e1->fullness == 0 && e2->fullness == 0) {
                        b1 = e1->itsfti->start.first;
                        b2 = e2->itsfti->start.first;
                        if(b1 < b2) return -1;
                        else return 1;
                }
                if(e1->fullness < e2->fullness) return -1;
                else return 1;
        }

/* prevent grotesque imbalances */
        b1 = e1->imbalance - e2->imbalance;
        b2 = b1;
        if(b2 < 0)
                b2 = -b2;
        if(b2 > rotsToClix(80.0))
                return b1 > 0 ? 1 : -1;
```

```
            bdiff = e1->fullness - e2->fullness;
        if(bdiff < 0)
                bdiff = -bdiff;

/* critical threshold 1 -- fullness takes over absolutely */ if(urgency > threshold1
        || xscstatebuff->nfreebuffs <= (nreads - nloadedreads) * 2) {
                d1 = 0;
                if(e2->state == aftlLOADED) d1 = -1;
                else if(e1->state == aftlLOADED) d1 = 1;
                else if(e1->fullness < e2->fullness) d1 = -1;
                else if(e2->fullness < e1->fullness) d1 = 1;
                if(d1 != 0) {
static char *statenames[] = {"","loaded","active","draining"};
if(dbgXSC) printf("rdcmp of %d(%s) and %d(%s) returns %d\n",e1p - aftlReads,
    statenames[e1->state], e2p - aftlReads, statenames[e2->state], d1);
                        return d1;
                }
        }

/* critical threshold 2 -- fullness takes over if file which would otherwise
 be chosen is grossly overbalanced. */ if(urgency > threshold1 - 0.01) {
                if(e1->sktm <= e2->sktm
                && e1->imbalance - e2->imbalance > rotsToClix(110.0))
                        return 1;
                if(e1->sktm > e2->sktm
                && e2->imbalance - e1->imbalance > rotsToClix(120.0))
                        return -1;
        }

/* else discriminate on seektime and then ... */ if(e1->sktm < e2->sktm)
                return -1;
        if(e1->sktm > e2->sktm)
                return 1;

/* if high urgency and run lengths differ, on run length and then ... */ if(urgency > .19) {
                if(e1->nAUs > e2->nAUs)
                        return 1;
                if(e1->nAUs < e2->nAUs)
                        return -1;
        }

/* if fullness differs enough, on that, and then ... */ if(bdiff >= rotsToClix(17.5)) {
                if(e1->fullness < e2->fullness)
                        return -1;
                else
                        return 1;
        }

/* on direction. */ if(xscstatebuff->curdisk != e1->dsk)
                if(e1->dsk == e2->dsk)
                        return 0;
                else
                        return 1;
```

```
            if(xscstatebuff->curdisk != e2->dsk)
                    return -1;
/* now e1's disk == e2's disk == curdisk */
            d1 = d2 = xscstatebuff->headposn[e1->dsk];
            d1 -= CYLINDER(e1->nextAU);
            d2 -= CYLINDER(e2->nextAU);
            if(d1 < 0) d1 = -d1;
            if(d2 < 0) d2 = -d2;
            if(d1 < d2)
                    return d2 - d1 < 10 ? 0 : -1;
            else
                    return d1 - d2 < 10 ? 0 : 1;
}

/*
 * From current state, decides if a hold will become necessary
 * in the "best case" foreseeable future. If so, returns an
 * indication of how far in the future -- how many transfers can
 * be done before the hold will become inevitable. If no hold
 * can be foreseen, it returns -1.
 * We foresee holds by doing a simple kind of lookahead scheduling.
 * needToHold() depends on the fact that splitrw() has sorted
 * aftiReads[] on fullness. No global state is changed by the
 * lookahead.
 * N.B. This routine is pretty flakey. I put in the compare with
 * ncritical to make the flakes less visible, but they are still there.
 */
needToHold()
{
register struct xscafti **rdp;
struct xscafti **lim;
struct xscstate *state;
long elapsedclix;
int xferbuffs, dspbuffs, origbuffs, whichxfer;

if(ncritical == 0) return -1;
            lim = &aftiReads[nreads];
            holdclix = 0;
            state = NEWSTRUCT(xscstatebuff, struct xscstate);
            state->xfercnt = 0;
            xferbuffs = 0;                  /* projected xfer actions */
            origbuffs = state->nfreebuffs;
            dspbuffs = origbuffs;           /* ongoing dsp actions */
            elapsedclix = 0;
            for(rdp = aftiReads; rdp < lim;) {
                    if((*rdp)->state == aftiLOADED) {
                            ++rdp;
                            continue;
                    }
                    if(xferbuffs + dspbuffs >= nwrites + minAUsNeeded) {
                                    /* do a read */
                            elapsedclix +=
                              rotsToClix((float)seektime(state, *rdp)) / 2;
                            if(elapsedclix >= (*rdp)->fullness) {
                                    whichxfer = state->xfercnt;
                                    free(state);
                                    if(whichxfer == 0) {
                                            holdclix = elapsedclix;
                                            holdclixtot += holdclix;
                                            ++holdcnt;
                                    }
                                    free(state);
                                    return whichxfer;
                            }
                            elapsedclix += 4 * CLIX_PER_AU; /* for 2 AU xfer */
```

```
                    stepstate(state, *rdp, 2);
                    ++rdp;
                    xferbuffs -= 2;
            } else {
                    if(maxwbuffs < 2)       /* must need to wait */
                            break;
                    /* do a write, assuming space can be found on current
                    cylinder (only if a write to current disk exists) */
                    elapsedclix += 4 * CLIX_PER_AU;  /* for 2 AU xfer */
                    xferbuffs += 2;                  /* the payoff */
            }
            dspbuffs = origbuffs - projectbuffs(elapsedclix);
        }
        free(state);
        return -1;
}

/*
 * Project positive and negative buffer crossing events based on current
 * afti tables and the time parameter (which is in clix).
 * Return the relative change in # of free buffers.
 */
projectbuffs(clix)
long clix;
{
register buffs;
register struct xscafti **p, **l;
register long f;

buffs = 0;
        p = aftiReads;
        l = aftiReads + nreads + ndrainingreads;
        for(; p < l; ++p) {
                f = clix - (*p)->CBtime;
                while(f > 0) {
                        ++buffs;
                        f -= CLIX_PER_AU;
                }
        }
        for(p = aftiWrites, l = aftiWrites + nwrites; p < l; ++p) {
                f = (*p)->CBtime;
                while(f < clix) {
                        --buffs;
                        f += CLIX_PER_AU;
                }
        }
        return buffs;
}

/*
 * If disk xfer process is getting too far ahead, set waitclix to
 * indicate when the disk xfer process should resume scheduling, and
 * return TRUE.
 */
needToWait()
{
register long t, u;
char *justification;
int active;

active = nreads + nwrites;
        if(active == 0) goto yes;
        if(maxwbuffs >= 2 || ndrainingwrites != 0) return FALSE;
        if(totalReadAUs != 0
        && xscstatebuff->nfreebuffs >= nwrites + minAUsNeeded)
                return FALSE;
```

```
yes:
/* wait till least of nextbbx, next entry, next activate. */
        waitclix = 0x7fffffff;
        if(active + ndrainingreads > nloadedreads) {
                waitclix = nextbbx;
                justification = "till next bbx";
        }
        if(nextentrytime != -1L) {
                t = nextentrytime - simclix;
                if(inputlist != NIL && READING(inputlist))
                        t -= PRELOAD_CLIX;
                if(t > 0 && t < waitclix) {
                        waitclix = t;
                        justification = "till next entry";
                }
        }
        if(nreads != 0 && nreads == nloadedreads) {
                register struct xscafti **p, **l;

t = 0x7fffffff;         /* positive infinity */
                for(p = aftiReads, l = aftiReads + nreads; p < l; ++p) {
                        u = (*p)->itsfti->start.first;
                        if(u < t) t = u;
                }
                ASSERT(t != 0x7fffffff, "failed search for next entry");
                t -= simclix;
                if(t < waitclix) {
                        waitclix = t;
                        justification = "till next activation";
                }
        }
        if(waitclix == 0x7fffffff) {
                waitclix = rotsToClix(0.5);
                justification = "programming error 1";
        }
        if(waitclix == 0) {
                waitclix = rotsToClix(0.5);
                justification = "programming error 2";
        } if(dbgXSC)
                printf("waiting (%s) %D clix\n", justification, waitclix);
        return TRUE;
}

/*
 * Receives indication of how soon the shuffle is needed.
 * Tries to find a good shuffle & adds it to shuffle list if successful.
 * Returns success status.
 * The goal in shuffling is to reduce the minimum read afti seek time.
 * Constraints on this goal include maintaining the global balance on
 * the disk, and getting the most results by shuffling a read afti that
 * needs to be read now.
 * As a result of this interaction, we rely on the fact that this routine
 * is called while the fullcmp() rules determine the ordering of
 * aftiReads[], i.e., the emptiest afti's are first.
 */
tryToShuffle(howsoon)
{
struct xscafti *xap, **rdp, *bestread;
int curcyl, disk;
register i, j, k;
int cyl, lim, seekt, minseekt;
int fullnessThreshold, maxcylfullness;
struct shuffle *shuf;
struct filesystem *fs;
```

```
            minseekt = 8;
            for(rdp = aftiReads; rdp < aftiReads + nreads; ++rdp)
                    if((*rdp)->sktm < minseekt)
                            minseekt = (*rdp)->sktm;

disk = xscstatebuff->curdisk;
            curcyl = xscstatebuff->headposn[disk];
            fs = xscstatebuff->curfs;
            i = sfd_freeAUcount(fs);
            if(i < 3600)
                    fullnessThreshold = 5;
            else if(i < 5760)
                    fullnessThreshold = 3;
            else
                    fullnessThreshold = 2;

/* if current cylinder sufficiently empty, switch to that one */ i = sfd_cylcount(fs, curcyl);
            if(i > fullnessThreshold) {
                    cyl = curcyl;
                    goto foundone;
            }

/* else enumerate cylinders having successively larger seek times */ for(seekt = 1;; ++seekt) {
                    i = (seekt - 1) & ~1;
                    j = seekt - i;          /* j == 1 or 2 */
                    k = seekdists[i] + j;
                    cyl = curcyl - k;
                    i = 2 * k;
                    j = 1;
                    lim = curcyl - (seekdists[seekt] + 2);
                    for(; cyl != lim;) {
                            if(cyl >= 0 && cyl < MAXCYL) {
                                    k = sfd_cylcount(fs, cyl);
                                    if(k > fullnessThreshold) {
                                            goto foundone;
                                    }
                            }
                            cyl += i * j;
                            i += 2;
                            j = -j;
                    }
                    if(seekt >= minseekt
                       || (howsoon > 2 && seekt >= minseekt - 2))
                            break;
            }
            return FALSE;

/*
 * We have a target cylinder. Now, we need to find a good read afti
 * to be the "from" of the shuffle. The algorithm combines fullness
 * of the current nextAU of each read afti with the number of full
 * buffers currently associated with it. Fullbuffs is given an
 * exponential slant, so that relatively urgent afti's are relatively
 * more likely to get shuffled.
 */ foundone:
            maxcylfullness = 32767;         /* i.e., infinite */
            bestread = NIL;
            for(rdp = aftiReads; rdp < aftiReads + nreads; ++rdp) {
                    xap = *rdp;
                    if(xap->dsk != disk || xap->fakeseek)
                            continue;
```

```
                i = CYLINDER(xap->nextAU);
                j = AUsPerCyl - sfd_cylcount(fs, i);
                k = (1 << xap->fullbuffs) * j;
                if(k < maxcylfullness) {
                        maxcylfullness = k;
                        bestread = xap;
                }
        }
        if(bestread == NIL)
                return FALSE;

/* set up the shuffle item */ shuf = ALLOC(1, struct shuffle);
        shuf->fileid = bestread->itsfti->fileid;
        shuf->where = bestread->itsfti->start.first;
        shuf->where += bestread->nextAUp - bestread->AUlist;
        shuf->newau = sfd_reserveAU(bestread->itsfti->fileid, cyl);
        shuf->next = shufflelist;
        shufflelist = shuf;
        return TRUE;
}

/* globally oriented massaging to catch special opportunities */
checkSpecialCases()
{
register struct xscafti **rdp, *rd0, *p, **minfullp = NIL;
long xferclix, minfull;

if(nreads < 2)
                return;
        if(ncritical || xscstatebuff->nfreebuffs <= nreads * 2)
                return;
        rd0 = aftiReads[0];
        if(rd0->sktm <= 1
        || urgency > .22
        || (ncritical > 1 && urgency >= .189))
                goto checkWarning;
        minfull = 5000000;
        for(rdp = &aftiReads[0]; rdp < &aftiReads[nreads]; ++rdp) {
                if(minfull > (*rdp)->fullness) {
                        minfull = (*rdp)->fullness;
                        minfullp = rdp;
                }
        }
        for(rdp = &aftiReads[1]; rdp < &aftiReads[nreads]; ++rdp) {
                p = *rdp;
                if(rd0->dsk != p->dsk)
                        continue;
                xferclix = getxferclix(p, CYLINDER(rd0->nextAU));
                if(p->sktm <= 2
                && p->sktm < rd0->sktm
                && p->nAUs > 0
                && p->imbalance - rd0->imbalance < rotsToClix(80.0)
                && ((p->nAUs == 2 && rd0->nAUs == 2)
                    || (p->sktm < 2 && urgency < 0.17)
                    || urgency < 0.15)
                && rd0->fullness > xferclix) {

/*        if(dbgXSC)
                        printf("checkSpecialCases swaps %d and 0\n",
                                rdp - aftiReads); */
                        aftiReads[0] = p;                 /* swap them */
                        *rdp = rd0;
```

```
                    if(minfullp == rdp)      /* minfullp too if nec. */
                            minfullp = aftiReads;
                    else if(minfullp == aftiReads)
                            minfullp = rdp;
                    break;
            }
        }

/* trap-catcher */ if(minfullp != aftiReads) {
                rd0 = aftiReads[0];
                p = *minfullp;
                xferclix = getxferclix(rd0, CYLINDER(p->nextAU));
                if(xferclix >= minfull) {
                        aftiReads[0] = *minfullp;
                        *minfullp = rd0;
                }
        }

/* turn on warning flag if critical */ checkWarning:
        rd0 = aftiReads[0];
        p = aftiReads[1];
        if(rd0->nAUs > 2) {
                if(urgency > .19
                   || p->fullness < getxferclix(rd0, CYLINDER(p->nextAU)))
                        rd0->nAUs = 2;
        }
}

/*
 * To decide whether to do a read or a write, we first eliminate the
 * simple cases -- lack of reads, writes or buffers.  If our decision
 * is not made, we decide based on urgency and the possibility of
 * inserting a write along the way without adding to overall seek time.
 * If we decide to do a write, must get an AU for it.
 * Note that at this point, it must be possible to do something, else
 * needToWait() would have said yes (hopefully!), preventing us from
 * arriving here.
 */
decideRW()
{
                                /* no writes to do => read. */
        if(maxwbuffs < 2 && ndrainingwrites == 0)
                return 1;
        if(nreads == 0)         /* no reads to do => write. */
                return bestwrite();
        if(xscstatebuff->nfreebuffs <= nwrites + 2) /* no buffers => write */
                return bestwrite();
        if(urgency >= .16)
                return 1;
        if(insertwrite())       /* if can write along the way, do so */
                return 0;
        if(avgwfullness <= 4)   /* if write buffers not too full, read */
                return 1;
        if(urgency < .14 || xscstatebuff->nfreebuffs < nwrites + 8)
                return bestwrite();
        return 1;
} prxscstate(holdflag, everything)
{
```

```
register struct xscafti *xap;
register struct xscstate *sb;
register long i;
/*static char *statestrgs[]={"!! UNUSED !!","LOADED","ACTIVE","DRAINING"};*/ if(not dbgXSC)
                return;
        if(everything) {
                sb = xscstatebuff;
                printf("time: %D clix = %g secs, ", simclix,
                  simclix/clixPerSecond);
                printf("nbuffs=%d, urgency=%g\n", sb->nfreebuffs, urgency);
                if(holdflag != -1)
                        printf("needToHold=%d\n", holdflag);
        }
        for(i = 0; i < nreads; ++i) {
                xap = aftiReads[i];
                printf("RD%d CBtime=%D,full=%D,imbal=%D,fb=%d,",
                  xap->trxnum, xap->CBtime, xap->fullness, xap->imbalance,
                  xap->fullbuffs);
                printf("cyl=%d,sktm=%d,AUsleft=%d,nAUs=%d\n",
                  CYLINDER(xap->nextAU), xap->sktm, xap->AUsleft, xap->nAUs);
        }
        if(not everything)
                return;

for(i = 0; i < nwrites; ++i) {
                xap = aftiWrites[i];
                printf("WRT%d CBtime=%D, full=%D, fb=%d, AUsleft=%d\n",
                  xap->trxnum, xap->CBtime, xap->fullness, xap->fullbuffs,
                  xap->AUsleft);
        }
        printf("\n");
}

/* XSC: write insertion, state update, putaction state machine, utilities */ include <fmx.h>
include <drivers.h>
#include <sfdfs.h>
#include <xsc.h>

/* These serve for separating read/write and sorting on priority, etc. */
struct xscafti *aftiReads[FTIMAX], *aftiWrites[FTIMAX];
int nreads, ndrainingreads, nwrites;
char preloadflag;

/* communication among local routines */
float urgency, avgwfullness;
struct SXLP *curpage;
long nextentrytime;

int holdcnt;              /* # of times holding happens */
long holdclix;
long holdclixtot;
int waitclix;
int waitclixtot;
long simclix;             /* total rots in simulated time so far */
short seekdists[8];

/* forward declarations */
int rdcmp(), fullcmp();
struct lkSXLE *mkLkSXLE();
```

```
long rotsToClix(rots)
float rots;
{
        return (long)(clixPerSecond * (rots / 60));
} float clixToRots(clix)
long clix;
{
        return 60.0 * (clix / clixPerSecond);
}

/************************************
**      WRITE INSERTION LOGIC      **
************************************/

/*
 * bestwrite() finds a cylinder close to the current one in seek time
 * and sets up the best write afti for that cylinder.  It always returns 0.
 */
bestwrite()
{
struct xscafti *wrt0, *wrt1;
int cyl, curcyl, disk, i, buffstowrite;
struct filesystem *fs;

fs = xscstatebuff->curfs;
        disk = xscstatebuff->curdisk;
        curcyl = xscstatebuff->headposn[disk];
        wrt0 = aftiWrites[0];
        buffstowrite = wrt0->fullbuffs;
        if(buffstowrite > 2)
                buffstowrite = 2;
        if(buffstowrite == 0) {
                ASSERT(wrt0->state == aftiDRAIN, "0-full, non-DRAINing??");
                buffstowrite = 1;
        }

/* 1. if write is on another disk, decide about a swap */
        if(wrt0->dsk != disk) {
                if(nwrites > 1) {
                        wrt1 = aftiWrites[1];
                        if(wrt1->dsk == disk
                        && wrt1->fullbuffs >= 2
                        && wrt1->fullbuffs >= wrt0->fullbuffs - 2) {
                                wrt0 = wrt1;
                                goto samedisk;
                        }
                }
                fs = wrt0->itsfti->fileid->itsfs;
                cyl = sfd_bestcyl(fs);
                i = sfd_cylcount(fs, cyl);
                ASSERT(i > 0, "full disk to bestwrite/1");
                if(i > buffstowrite)
                        i = buffstowrite;
                allocwrite(wrt0, cyl, i);
                return 0;
        }
samedisk:

/* 2. for same disk, if urgency is low enough, put it anywhere */
/* this threshold needs some experimenting */
        if(urgency < 0.05)
                goto putanywhere;
```

```
/* 3. if the current cylinder is available, use it */
        i = sfd_cylcount(fs, curcyl);
        if(i >= buffstowrite) {
                allocwrite(wrt0, curcyl, buffstowrite);
                return 0;
        }

/* look for a cylinder 1/2 rot and a full rot distant */
        if(findcyl(curcyl, 1, wrt0, buffstowrite)
        || findcyl(curcyl, 2, wrt0, buffstowrite))
                return 0;

/* give up and put it anywhere */
putanywhere:
        cyl = sfd_bestcyl(fs);
        i = sfd_cylcount(fs, cyl);
        ASSERT(i > 0, "full disk to bestwrite/2");
        if(i > buffstowrite)
                i = buffstowrite;
        allocwrite(wrt0, cyl, i);
        return 0;
}

/*
 * Look for a cylinder at a given distance.  If one is found,
 * allocate the current write with it.  Return success status.
 */
findcyl(curcyl, seektime, xap, needcount)
register struct xscafti *xap;
int curcyl, seektime, needcount;
{
register i, j, k;
register cyl;
int lim;
int bestcount, bestcyl;
struct filesystem *fs;

fs = xap->itsfti->fileid->itsfs;
        i = (seektime - 1) & ~1;
        j = seektime - 1;           /* j = 1 or 2 */
        k = seekdists[i] + j;
        cyl = curcyl - k;
        i = 2 * k;
        j = 1;
        bestcount = 0;
        lim = curcyl - (seekdists[seektime] + 2);
        for(; cyl != lim;) {
                if(cyl >= 0 && cyl < MAXCYL) {
                        k = sfd_cylcount(fs, cyl);
                        if(k > bestcount) {
                                bestcount = k;
                                bestcyl = cyl;
                        }
                }
                cyl = curcyl + i * j;
                i += 2;
                j = -j;
        }
        if(bestcount >= needcount) {
                allocwrite(xap, bestcyl, needcount);
                return TRUE;
        }
        return FALSE;
}
```

```
/*
 * This routine does an exhaustive search of all the possible ways
 * that it might insert a write between the current cylinder and that
 * of the next read without increasing the seektime.  If some of these
 * stopping points are "reasonably" empty, it programs the inserted
 * write and returns TRUE, else it returns FALSE.
 * insertwrite() is responsible for first ensuring that we are talking
 * always about the same disk.
 */
insertwrite()
{
struct xscafti *rd0, *wrt0;
int disk, seektime0;
int i;
int st1, st2;
int d, d0, d1, d2;
int curcyl, cyl0, midcyl;
int overlap, dir;

/* The array stores possible stopping points, and maxcount records what
the cylcount of the items in the array is.  We don't bother to keep items
with a lower cylcount than the max found so far.  nstops tells how many
such items we've found.  It is never greater than MAXSTOPS -- if we find
that many, we just stop recording them. */
#define MAXSTOPS 40
short stops[MAXSTOPS];
int maxcount, nstops;
struct filesystem *fs;

/* variable setup and reasonableness test */ rd0 = aftiReads[0];
        seektime0 = rd0->sktm;
        wrt0 = aftiWrites[0];
        disk = xscstatebuff->curdisk;
        fs = xscstatebuff->curfs;
        if(disk != rd0->dsk || disk != wrt0->dsk)
                return FALSE;
        curcyl = xscstatebuff->headposn[disk];
        cyl0 = CYLINDER(rd0->nextAU);
        d0 = curcyl - cyl0;
        dir = -1;
        if(d0 < 0) {
                d0 = -d0;
                dir = -dir;
        }

/* collect data from SFDFS about possible stopping points */ nstops = maxcount = 0;
        st1 = 1;
        st2 = seektime0 - st1;
        for(; st2 > 0; ++st1, --st2) {
                d1 = seekdists[st1];
                d2 = seekdists[st2];
                overlap = d1 + d2 - d0;
                if(overlap < 0)
                        continue;       /* too far away */
                for(d = d1 - overlap; d <= d1; d += 2) {
                        midcyl = curcyl + d * dir;
                        i = sfd_cylcount(fs, midcyl);
                        if(i < 2)
                                continue;
                        /* otherwise, record it as a possible stopping pt */
                        if(i > maxcount) {
                                maxcount = i;
                                nstops = 0;
```

```
                    }
                    if(nstops < MAXSTOPS)
                            stops[nstops++] = midcyl;
            }
    }
    /* use the data to decide what to do */ if(maxcount >= 6 || (avgwfullness > 2 && maxcount >= 3)) {
                    if(nstops == 1) i = 0;
                    else i = randab(0, nstops - 1);
                    d = maxcount;
                    if(d > wrt0->fullbuffs)
                            d = wrt0->fullbuffs;
                    allocwrite(wrt0, stops[i], d);
                    return TRUE;
            }
            return FALSE;
}

/*
 * Given a write afti and a cylinder, tell SFDFS about some new AUs at
 * that cylinder, and fix the write afti itself correspondingly.
 * Its caller is responsible for deciding exactly how many AUs to write --
 * this number is passed in as nAUs.
 */
allocwrite(xap, cyl, nAUs)
register struct xscafti *xap;
{
short i;

if(dbgXSC)
                printf("allocwrite(%X, %d, %d)\n", xap, cyl, nAUs);
        xap->nAUs = nAUs;
        if(xap->fakeseek != 0)
                return;

/* the justification for making the nextAU comp of write aftis contain
the current index (instead of the current cylinder) is here.  It does
simplify the call to allocAU. */
        for(; --nAUs >= 0; ++xap->nextAU) {
                i = sfd_allocAU(xap->itsfti->fileid, xap->nextAU, cyl);
                if(i == 0)
                        cafard("allocAU says no!");
                *xap->nextAUp++ = i;
        }
        xap->nextAUp -= xap->nAUs;      /* updated officially by putAction */
}

/************************
**    STATE UPDATE    **
************************/

/*
 * Called to update a (struct xscstate) when we decide on a transfer
 * or want to look ahead (only for needToHold()).  Because there are
 * two uses, we pass in the struct explicitly.
 */
stepstate(state, action, nAUs)
```

```
register struct xscstate *state;
register struct xscafti *action;
{
register disk, cyl;

if(dbgXSC)
                printf("stepstate(%X, %X, %d)\n", state, action, nAUs);
        disk = action->dsk;
        state->AUsLastTime = nAUs;
        state->lastref[disk] = state->xfercnt++;
        state->curdisk = disk;
        state->curfs = action->itsfti->fileid->itsfs;
        cyl = READING(action) ? action->nextAU : *action->nextAUp;
        state->headposn[disk] = CYLINDER(cyl);
        state->nfreebuffs -= READING(action) ? nAUs : -nAUs;
        if(state == xscstatebuff && state->nfreebuffs < 0)
                error("stepstate sets nbuffs < 0");
}

/*
 * Called to update when we decide to schedule a transfer.
 * Do action specific stuff for chosen afti, then increment simulated time.
 */
stepaftis(action)
register struct xscafti *action;
{
long xferclix;
register unsigned i;

xferclix = rotsToClix((float)(action->sktm + 4 * action->nAUs)) / 2;

/* 1. update the affected action */ action->AUsleft -= action->nAUs;
        if(READING(action)) {
                action->fullbuffs += action->nAUs;
                action->fullness += CLIX_PER_AU * action->nAUs;
                if(action->fakeseek) {
                        getFakeCyl(action);
                        action->nAUs = min(action->AUsleft, 2);
                } else {
                        if((action->nAUs = countAUs(action)) != 0) {
                                action->nextAU = *(action->nextAUp);
                                i = CYLINDER(action->nextAU);
                                if(i > MAXCYL) {
                                        error("%d: nextAU range", i);
                                        action->nextAU = 0;
                                }
                        }
                }
        } else {
                action->fullbuffs -= action->nAUs;
                action->fullness -= CLIX_PER_AU * action->nAUs;
        }

/* 2. update the simulated time for all active FTI's */ incrtime(xferclix - holdclix);

} incrtime(aclix)
long aclix;
{
```

```
register long clix, tmp;
register struct FTI *ftip;
register struct xscafti *xap;
int active;

if(preloadflag)
                return;

/* 1. go thru the aftitbl, fixing fullnesses, changing states, etc. */ if(dbgXSC)
                printf("incrtime(%d)\n", aclix);
        simclix += aclix;
        for(xap = aftitbl; xap < &aftitbl[FTIMAX]; ++xap) {
                clix = aclix;
                switch(xap->state) {
                case aftiUNUSED:
                        /* remember how long this guy has been inactive */
                        xap->CBtime += clix;
                        break;
                case aftiLOADED:
                        tmp = simclix - xap->itsfti->start.first;
                        if(tmp < 0)
                                break;
                /* else activate and fall through for incr-rd/wrt */
                        xap->state = aftiACTIVE;
                        clix = tmp;
                        --xscstatebuff->nfreebuffs;
                        if(dbgXSC) {
                                printf("loaded %s%d activated, ",
                                  READING(xap) ? "RD" : "WRT", xap->trxnum);
                                printf("%D clix made up\n", tmp);
                        }
                case aftiACTIVE:
                        tmp = simclix - xap->itsfti->end.last;
                        if(WRITING(xap) && tmp >= 0) {
                                xap->fullness += clix - tmp;
                                xscstatebuff->nfreebuffs -= setfullness(xap);
                                if(xap->CBtime != 0) ++xap->fullbuffs;
                                if(dbgXSC)
                                printf("wrt drn:fullbuffs=%d,ausleft=%d\n",
                                  xap->fullbuffs, xap->AUsleft);
                                xap->state = aftiDRAIN;
                                break;
                        }
                        /* fall through */
                case aftiDRAIN:
                        if(READING(xap))
                                incrread(xap, clix);
                        else
                                incrwrite(xap, clix);
                        break;
                }
        }

/* 2. look at the head of the FTI list, adding new afti's as required */ clix = simclix + PRELOAD_CLIX;
                /* don't overextend iochans */
        active = nreads + nwrites + ndrainingreads;
        for(ftip = inputlist;; ++active, LLSTEP(ftip)) {
                if(ftip == NIL
                || ftip->start.first > clix
                || active >= iochans_available)
                        break;
                if(dbgXSC) printf("     adds new afti\n");
                newxscafti(ftip);
```

```
            }
            inputlist = ftip;
            nextentrytime = ftip == NIL ? -1L : ftip->start.first;
}

/*
 * xap->fullness has been set.  Bring fullbuffs and CBtime into
 * consistency, and return the # of buffer crossings + or -.
 */
setfullness(xap)
register struct xscafti *xap;
{
register i;
        i = xap->fullbuffs;
        xap->CBtime = xap->fullness % CLIX_PER_AU;
        xap->fullbuffs = xap->fullness / CLIX_PER_AU;
        return xap->fullbuffs - i;
} incrread(xap, clix)
register struct xscafti *xap;
long clix;
{
        xap->fullness -= clix;
        if(xap->fullness < 0 && xap->state != aftiDRAIN) {
                error("RD%d underrun", xap->trxnum);
                xsc_fails = TRUE;
                return;
        }
        xscstatebuff->nfreebuffs -= setfullness(xap);
        if(xap->state == aftiDRAIN) {
                if(xap->fullness < 0) {
                        xap->CBtime += clix;    /* CBtime was < 0 */
                        xap->fullbuffs = 0;
                        ++xscstatebuff->nfreebuffs;
                        free(xap->AUlist);
                        xap->state = aftiUNUSED;
                }
        } else {
                ASSERT(xap->fullbuffs >= 0, "underrun?");
                if(xap->AUsleft == 0)
                        xap->state = aftiDRAIN;
        }
} incrwrite(xap, clix)
register struct xscafti *xap;
long clix;
{
        if(xap->state == aftiDRAIN) {
                if(xap->AUsleft == 0) {
                        xap->state = aftiUNUSED;
                        xap->CBtime = clix;
                }
        } else {
                xap->fullness += clix;
                xscstatebuff->nfreebuffs -= setfullness(xap);
                if(xscstatebuff->nfreebuffs < 0) {
                        error("WRT%d can't get enough buffers", xap->trxnum);
                        xsc_fails = TRUE;
                }
        }
}
```

```
/*
 * This is where the punchin simulation stuff happens.  The result is
 * obtained by side effect thru the nextAU component of 'action'.  The
 * only complexity is deriving a "worse than usual" cylinder the first
 * few times in order to provide a buffer  of prudence vis a vis the
 * stochastic walk which we'll be taking.
 */
getFakeCyl(action)
register struct xscafti *action;
{
int curcyl;

action->nextAU = randab(0, 800);
        if(action->fakecount == 0)
                return;
        --action->fakecount;
        curcyl = xscstatebuff->headposn[action->dsk];
        while(seektime1(curcyl, action->nextAU) < 4)
                action->nextAU = randab(0, 800);
} newxscafti(ftip)
register struct FTI *ftip;
{
register struct xscafti *xap, *new;
int aul, got;
long clixtot;

new = NIL;
        for(xap = aftitbl; xap < aftitbl + FTIMAX; ++xap) {
                if(xap->state == aftiUNUSED
                && (new == NIL || xap->CBtime > new->CBtime))
                        new = xap;
        }
        if(new == NIL)
                cafard("active table overflow from scheduler");

ftip->trxnum = new->trxnum = new - aftitbl;
        new->itsfti = ftip;
        new->action = ftip->action;
        new->dsk = ftip->disk;
        new->state = aftiLOADED;
        new->fullbuffs = 0;
        new->fullness = 0;
        new->CBtime = 0;
        clixtot = ftip->end.last - ftip->start.first;
        clixtot += ftip->firstClickInfile % CLIX_PER_AU + CLIX_PER_AU - 1;
        new->AUsleft = clixtot / CLIX_PER_AU;
        if(ftip->start.first != ftip->start.last
        || ftip->end.first != ftip->end.last) {
                new->fakeseek = TRUE;
                new->fakecount = 5;
                getFakeCyl(new);
        } else {
                new->fakeseek = FALSE;
                aul = ftip->firstClickInfile / CLIX_PER_AU;
                new->AUlist = ALLOC(new->AUsleft, short);
                if(new->action == DISKREAD) {
                        got = sfd_getAUs(ftip->fileid, aul, new->AUsleft,
                         new->AUlist);
                        if(got != new->AUsleft) {
                                error("can't getAUs enough for new xscafti");
                                new->AUsleft = got;
                        }
                } else {
                        BLKCLEAR(new->AUlist, sizeof(short) * new->AUsleft);
```

```
            }
            new->nextAUp = new->AUlist;
            new->nextAU = *(new->nextAUp);
            if(new->action == DISKREAD)
                    new->nAUs = countAUs(new);
      }
}

/* return # of clix to do action then seek to newcyl */
long getxferclix(action, newcyl)
register struct xscafti *action;
{
int cyl;
register long xferhalfrots;

cyl = CYLINDER(action->nextAU);
        xferhalfrots = action->sktm + 4*action->nAUs + seektimel(cyl, newcyl);
        return rotsToClix(xferhalfrots) / 2;
}

/***************************************
****    PUT SCHEDULE ACTIONS        ****
***************************************/

/*
 * putAction() deals with 2 different problems:  first, "pagination" of
 * output;  second, prior insertion of seeks where necessary.  These
 * two functions don't mix very well.  The policy on seeks is as follows:
 * we insert the seek either (1) after the last cmd to the relevant disk
 * or (2) two cmds ago, whichever is later.
 * Because inserting things in the middle is not all that easy with a
 * paged data structure, I've decided to build up a page's worth of
 * pure linked list, then compact that (by the way, I'm sticking with
 * the paged DS for memory usage reasons -- with the SXLE list sizes
 * we may get in sound mixing applications, the link word overhead could
 * add up to 10Kbytes or greater).  We keep a pointer to where the next
 * transfer command goes, and another to where the next seek cmd (if any)
 * goes (actually, that's a little white lie.  In fact, we keep another
 * ptr two items behind the xfer ptr and validate it when we need to
 * insert a seek).
 * One tricky point is that we need to add a seek cmd to the end of the
 * preload list for the first xfer cmd on each disk.
 */ struct lkSXLE *nextxfer;        /* these start out NIL */
struct lkSXLE *nextseek;
int sxlecount;                  /* to trigger pagination */
char firstseekflag;             /* 1 bit for each disk */

/*
 * The preloader uses putAction() just like the scheduler.  When
 * it gets done, it moves the list (still in linked form) to
 * preloadproto, changing it to the circular-linked-header-points-to-end
 * format.  When putAction() wants to add seek cmds to it (controlled
 * by bits in firstseekflag), it does so, knowing about this format.
 * When scheduling is done, we know we've used all the disks we possibly
 * can, so it's safe to paginate preloadproto.
 */
```

```
putAction(action)
register struct xscafti *action;
{
int i;

if(dbgXSC) {
                i = action->action == DISKREAD ?
                  action->nextAU : *action->nextAUp;
                printf("putAction: %s%d nAUs=%d, cyl=%d\n",
                  action->action == DISKREAD ? "RD" : "WRT", action->trxnum,
                  action->nAUs, CYLINDER(i));
        }
        for(i = action->nAUs; --i >= 0;) {
                newSXLE(action);
/*              if(action->action == DISKREAD)
                        action->nextAU = *action->nextAUp;      */
                ++action->nextAUp;
        }
} newSXLE(action)
register struct xscafti *action;
{
register struct lkSXLE *p;

/* maybe insert a seek */
        if(not preloadflag
          && ((firstseekflag & BIT(action->dsk)) == 0
           || action->dsk != xscstatebuff->curdisk)) {
                p = mkLkSXLE(action);
                p->s.cmd = DISKSEEK;
                if((firstseekflag & BIT(action->dsk)) == 0) {
                        if(preloadproto == NIL) {
                                preloadproto = p->next = p;
                        } else {
                                p->next = preloadproto->next;
                                preloadproto->next = p;
                                LLSTEP(preloadproto);
                        }
                        firstseekflag |= BIT(action->dsk);
                } else if(nextseek->next->s.disk == action->dsk) {
                        /* n.b. use of nextseek guarantees safety of above ref */
                        LLSTEP(nextseek);
                        p->next = nextseek->next;
                        nextseek->next = p;
                        ++sxlecount;
                } else {
                        p->next = nextseek->next;
                        nextseek->next = p;
                        LLSTEP(nextseek);  /* nextseek stays 2 elts back */
                        ++sxlecount;
                }
        }

/* now add the new action */
        p = mkLkSXLE(action);
        if(nextxfer == NIL) {
                upgSxles = nextxfer = p;
        } else {
                nextxfer->next = p;
                LLSTEP(nextxfer);
                if(nextseek == NIL && sxlecount == 2)
                        nextseek = upgSxles;
        }
        ++sxlecount;
```

```
/* and maybe paginate */
        if(sxlecount > SXLEPerPage + 2 && not preloadflag)
                paginate(&upgSxles, &sxlecount, &curpage, &firstpage);
} struct lkSXLE *mkLkSXLE(action)
register struct xscafti *action;
{
register struct lkSXLE *p;
register au;

p = NALLOC(1, struct lkSXLE);
        p->s.cmd = action->action;
        p->s.disk = action->dsk;
        au = *action->nextAUp;
        p->s.cylinder = CYLINDER(au);
        p->s.surface = SURFACE(au);
        p->s.trxnum = action->trxnum;
        return p;
} paginate(lhd, count, pagenow, pagel)
struct lkSXLE **lhd;
int *count;
struct SXLP **pagenow, **pagel;
{
register struct SXLP *pg;
register i;
register struct lkSXLE *p, *q;
register struct SXLE *t;

if(dbgXSC) {
                printf("paginating the following:\n");
                i = 0;
                p = *lhd;
                for(i = 0, p = *lhd; p != NIL; ++i, LLSTEP(p)) {
                        if(p->s.cmd == DISKSEEK) {
                                printf("SEEK%d cyl=%d\n", p->s.disk,
                                    p->s.cylinder);
                                continue;
                        }
                        printf("%s%d cyl=%d, surf=%d, trx=%d\n",
                            p->s.cmd == DISKREAD ? "RD" : "WRT", p->s.disk,
                            p->s.cylinder, p->s.surface, p->s.trxnum);
                }
                printf("...and here goes...\n");
        }
        p = *lhd;
        if(p == NIL) {  /* empty schedule */
                *pagenow = NIL;
                *pagel = NIL;
                return;
        }
        pg = NALLOC(1, struct SXLP);
        t = pg->pageElts;
        for(i = SXLEPerPage; p != NIL && i > 0; --i) {
                *t++ = p->s;
                q = p->next;
                free(p);
                p = q;
        }
        i = SXLEPerPage - i;    /* how many elts actually on page */
        pg->nElts = i;
        *count -= i;
        *lhd = p;
```

```
        if(*page1 == NIL) {
                *pagenow = pg;
                *page1 = pg;
        } else {
                (*pagenow)->next = pg;
                *pagenow = pg;
        }
}

/*
 * Here is the code that cleans up sxle pages after the scheduling is
 * finished.  First, paginate any run-time sxle's that are hanging
 * around, then paginate the preload list (we have to do it now because
 * on a multiple-disk system, a seek command could be added to it late
 * in the scheduling process).  The firsttime flag enables this since
 * if we are rescheduling, there will be no preloading.
 */
xscDoneFixup(firsttime)
{
/* this is a loop because it might have to be done twice (never more) */
        while(sxlecount != 0)
                paginate(&upgSxles, &sxlecount, &curpage, &firstpage);
        if(not firsttime)
                return;
        if(dbgXSC)
                printf("paginating preloads...\n");
        decircularize_preloadproto();
        while(preloadsxlecount > 0)
                paginate(&preloadproto, &preloadsxlecount, &curpage,
                 &preloadpage);
} decircularize_preloadproto()
{
struct lkSXLE *tmp;

if(preloadproto != NIL) {
                tmp = preloadproto->next;
                preloadproto->next = NIL;
                preloadproto = tmp;
        }
}

/***********************
****    UTILITIES    ****
***********************/

/*
 * returns # of 1/2 rots to seek from current state to perform seek
 * for given action.
 */
seektime(state, xap)
register struct xscstate *state;
register struct xscafti *xap;
{
register i, j;
int oldcyl, newcyl;

if(preloadflag)
                return 0;
        newcyl = CYLINDER(xap->nextAU);
        oldcyl = state->headposn[xap->dsk];
```

```
                if(state->curdisk != xap->dsk) {
                        i = (newcyl & 1) + 2;   /* rot'l latency + offset */
                        /* decide if overlapped seek would not finish */
                        if(state->AUsLastTime == 1
                        && state->lastref[xap->dsk] == state->xfercnt - 1) {
                                j = seektime1(oldcyl, newcyl);
                                if(j > 4)
                                        i += j - 4;
                        }
                        return i;
                }
                return seektime1(oldcyl, newcyl);
        }

/* returns seek time on one disk given initial and final cylinders */
seektime1(start, end)
{
        start -= end;
        if(start < 0) start = -start;
        return seektime2(start);
}

/* returns seek time on one disk given distance */
seektime2(distance)
register distance;
{
register st;
#define odd(x)  ((x)&1)

for(st = 0; st < 8; ++st)
                if(distance <= seekdists[st])
                        break;
        if(st >= 8) {
                error("can't seek %d cylinders!", distance);
                return 10;
        }
        if(odd(distance)) st |= 1;
        else st = (st + 1) & ~1;
        return st;
}

/* utility to find the # of AU's in the next xfer.  Reads only */
countAUs(xap)
struct xscafti *xap;
{
register short *p;
register i;
int newcyl;

if(xap->AUsleft == 0)
                return 0;
        ^p = xap->nextAUp;
        newcyl = *p++;
        newcyl = CYLINDER(newcyl);
        for(i = 1;; ++i)
                if(CYLINDER(*p++) != newcyl || xap->AUsleft <= i || i > 9)
                        break;
        if(i > 9) error("countAUs > 9");
        return i;
}
```

```
/* XSC: initialization and setup routines */ include <fmx.h>
include <drivers.h>
#include <sfdfs.h>
#include <xsc.h>

/* These serve for separating read/write and sorting on priority, etc. */
struct xscafti *aftiReads[FTIMAX], *aftiWrites[FTIMAX];
int nreads, nwrites;

int holdcnt;               /* # of times holding happens */
long holdclix;
long holdclixtot;
int waitclix;
int waitclixtot;
long simclix;              /* total rots in simulated time so far */
short seekdists[8];

/* forward declarations */
int rdcmp(), fullcmp();
struct lkSXLE *mkLkSXLE();

/* defines that initxsc() uses to initialize the putAction state machine */ struct lkSXLE *upgSxles;       /* these start out NIL */
struct lkSXLE *nextxfer;       /* these start out NIL */
struct lkSXLE *nextseek;
int sxlecount;                 /* to trigger pagination */
char firstseekflag = 0;        /* 1 bit for each disk */
char preloadflag = 0;          /* to prevent pagination */ struct xscstate *xscstatebuff = &globl_xscstatebuff;

/*
 * Sets up the various aspects of state for the scheduler, and decides
 * about preloading.  Assumes checkFeasible() has already been called.
 * Even so, some things are more convenient to check here, so it
 * returns its success status.
 */
initxsc(dsp)
{
register struct FTI *ftip;
register struct xscafti *xap;
struct xscafti **rdp;
struct diskState *dkstate;
int i, nbuffers, aumax;
long lowstart;

dkstate = &dspstate[dsp].d;
        BLKCLEAR(xscstatebuff, sizeof(struct xscstate));
        xscstatebuff->curdisk = inputlist->disk;
        xscstatebuff->curfs = inputlist->fileid->itsfs;
        xscstatebuff->nfreebuffs = dkstate->buffsTotal;
        /* note: clearing aftitbl sets its state components to aftiUNUSED */
        BLKCLEAR(aftitbl, sizeof(struct xscafti) * FTIMAX);

/* fill the aftitbl with preloadable stuff */ if(inputlist == NIL) {
                error("empty schedule?");
                return FALSE;
```

```
            }
            ftip = inputlist;
            lowstart = PRELOAD_CLIX;
            for(i = 0; i < iochans_available; ++i, LLSTEP(ftip)) {
                    if(ftip == NIL || ftip->start.first > PRELOAD_CLIX)
                            break;
                    if(ftip->start.first < lowstart)
                            lowstart = ftip->start.first;
                    newxscafti(ftip);
            }
            inputlist = ftip;
    /*
     * Now do some preloading.  The strategy is to almost fill the memory
     * with preloaded buffers, leaving room for nwrites, and for the first
     * disk activities when the runthru starts.  We attempt to give equal
     * weight to each afti by preloading round-robin.  First, initialize
     * putAction()-related variables.
     */ upgSxles = NIL;
            nextxfer = NIL;
            nextseek = NIL;
            simclix = 0;
            sxlecount = 0;
            firstseekflag = 0;
            preloadflag = TRUE;     /* to prevent pagination */
            i = LLlen(dkstate->freeBuffs);
            if(i != dkstate->buffsTotal)
                    warning("missing buffers in dsp %d", (char *)dsp);

/* splitrw() knows about preloadflag */
            if(splitrw() == 0)
                    cafard("splitrw call in preload");
            if(nreads == 0)
                    goto preload_done;
            nbuffers = i;
            nbuffers -= min(nreads, 4) + 2 * nwrites;
            aumax = nbuffers / nreads;
            if(aumax > 4)
                    aumax = 4;
            if(dbgXSC) {
                    printf("preloading with nbuffers=%d, aumax=%d, nreads=%d\n",
                     nbuffers, aumax, nreads);
            }
            /* i counts the # of completed inner loops */
            for(i = 0; nbuffers > 0; ++i) {
                    prxscstate(-1, 0);
                    for(rdp = aftiReads; rdp < aftiReads + nreads; ++rdp) {
                            xap = *rdp;
                            if(xap->AUsleft <= 1)
                                    goto nomorebuffs;
                            if(xap->nAUs > aumax)
                                    xap->nAUs = aumax;
                            if(nbuffers < xap->nAUs) {
                                    if(nbuffers < 2)
                                            goto nomorebuffs;
                                    else
                                            xap->nAUs = nbuffers;
                            }
                            putAction(xap);         /* must be called first! */
                            stepstate(xscstatebuff, xap, xap->nAUs);
                            stepaftis(xap);
                            nbuffers -= xap->nAUs;
                    }
            }
```

```
nomorebuffs:
        if(i == 0) {                    /* didn't get thru a loop pass */
                error("not enough buffers to preload schedule");
                return FALSE;
        }

/* activate preloaded read afti's */
        if(lowstart != 0L) {
                preloadflag = FALSE;    /* so incrtime can do something */
                incrtime(lowstart);
        } else {
/*              for(rdp = aftiReads; rdp < aftiReads + nreads; ++rdp) {
                        xap = *rdp;
                        if(xap->itsfti->start.first == lowstart)
                                xap->state = aftiACTIVE;
                } */
        }

/* now switch the generated SXL code to preloadlist, and get ready for
real scheduling */ preload_done:
        preloadproto = upgSxles;
        if(preloadproto != NIL) {
                struct lkSXLE *tmp;

for(tmp = preloadproto; tmp->next != NIL; LLSTEP(tmp))
                        ;
                tmp->next = preloadproto;
                preloadproto = tmp;
        }
        preloadsxlecount = sxlecount;
        upgSxles = NIL;
        nextxfer = NIL;
        nextseek = NIL;
        sxlecount = 0;
        preloadflag = FALSE;
        return TRUE;
}

/*
 * Decides if a sound file cue sheet is theoretically possible.
 * Depends on inputlist being sorted on start time (same is true
 * for scheduler proper).  Returns TRUE or FALSE.
 * Side-effect:  makes buffer pool large enough for schedule (if
 * possible, else returns FALSE).
 */
checkFeasible(dsp)
{
int chnls, maxchnls, writebuffs[MAXDISKS], i;
long f, totclix, curtime, maxtime;
struct FTI *ftip;
struct ftiqueue {
        struct ftiqueue *next;
        long stoptime;
};
struct ftiqueue *qhd, *p, *q;
float meanbw;

if(dsp >= NDSPS) {
                error("dsp out of range to xsc");
                return FALSE;
```

```
        }
        maxchnls = chnls = 0;
        iochans_available = dspstate[dsp].sysmat.iochanCnt;/* used globally */
        totclix = curtime = maxtime = 0;
        for(i = 0; i < MAXDISKS; ++i)
                writebuffs[i] = 0;

/* do a rough, "symbolic execution" of the FTI list */
        qhd = NIL;
        for(ftip = inputlist;;) {

/* 1. add active items */ while(ftip != NIL
                && (qhd == NIL || ftip->start.first < qhd->stoptime)) {
                        ++chnls;
                /* assume duration already rounded up to nearest buffer */
                        f = ftip->end.last - ftip->start.first; /* # clix */
                        totclix += f;
                        if(ftip->action == DISKWRITE)
                                writebuffs[ftip->disk] += f / CLIX_PER_AU;
                        p = NALLOC(1, struct ftiqueue);
                        p->stoptime = ftip->end.last;
                /* classic linked insert, sorted (items with lower
                stoptimes go first). */
                        LLptraverse(qhd, q, struct ftiqueue)
                                if(q->next->stoptime > p->stoptime)
                                        break;
                        p->next = q->next;
                        q->next = p;
                        LLSTEP(ftip);
                }
                if(chnls > maxchnls)
                        maxchnls = chnls;
                if(ftip == NIL)
                        curtime = 1000000000;   /* infinity */
                else
                        curtime = ftip->start.first;

/* 2. delete active items */ while(qhd != NIL && qhd->stoptime < curtime) {
                        --chnls;
                        p = qhd;
                        maxtime = p->stoptime;
                        qhd = qhd->next;
                        free(p);
                }
                if(ftip == NIL)
                        break;
        }
        /* each chnl needs an iochan slot in the sysmat */
        if(maxchnls > iochans_available) {
                error("not enough iochans for schedule");
                return FALSE;
        }
        /* each chnl needs at about 5 buffers at a time */
        if(not getbuffers(&dspstate[dsp], maxchnls * 5)) {
                error("can't get enough disk buffers");
                return FALSE;
        }
        /* check that disks aren't too full */
        for(i = 0; i < nextOFS; ++i) {
                if(writebuffs[i] > sfd_freeAUcount(&openfilesystems[i])) {
                        error("disk %d too full", (char *)i);
                        return FALSE;
                }
```

```
        }
/* return a boolean based on the average bandwidth of disk xfer */ meanbw = (float)totclix / (maxtime / clixPerSecond);
        return meanbw < MAX_DISK_BW;
}

/* make the buffer pool at least as big as count or return failure. */
getbuffers(dsps, count)
struct dspState *dsps;
{
register struct diskState *dks;
register struct dsksBuffer *b;
register long newb;
        dks = &dsps->d;
        for(count -= dks->buffsTotal; count > 0; --count) {
                newb = bloxalloc(dsps->bulkmap, CLIX_PER_AU, -1);
                if(newb == -1)
                        return FALSE;
                dks->bulkbufferbottom = newb;
                b = ALLOC(1, struct dsksBuffer);
                b->dmaAddr = newb;
                LLfrontput(dks->freeBuffs, b);
                ++dks->nfreeBuffs;
                ++dks->buffsTotal;
        }
        return TRUE;
}

/*
 * Called to free the partially completed schedule when scheduling fails.
 * Always called before preloads are paginated (=> preloadPage == NIL).
 */
xscCleanup()
{
        undoShufflelist();
        LLfree(preloadproto);
        preloadproto = NIL;
        LLfree(firstpage);
        firstpage = NIL;
        LLfree(upgSxles);
        upgSxles = NIL;
} undoShufflelist()
{
struct shuffle *shufl, *nxshufl;

if(shufflelist) {
                for(shufl = shufflelist; shufl != NIL;) {
                        if(not sfd_unreserveAU(shufl->fileid))
                                error("can't unreserve shuffle");
                        nxshufl = shufl;
                        free(shufl);
                        shufl = nxshufl->next;
                }
        }
        shufflelist = NIL;
}
```

```
/***********************
**    XSC DEBUGGING    **
***********************/ include <sym.h> include <scan.h> doPrschedCmd(alpp)
struct argList **alpp;
{
struct argList *alp;
register struct SXLP *page;
int i;

LLtraverse((*alpp), alp) {
                for(i = 0; i < NDSPS; ++i) {
                        printf("PRELOAD COMMANDS (dsp %d):\n", i);
                        page =alp->thisArg->v.zBinding->v.zCS->diskpreload[i];
                        for(; page != NIL; LLSTEP(page))
                                printPageOfSched(page);
                }
                for(i = 0; i < NDSPS; ++i) {
                        printf("RUNTIME COMMANDS (dsp %d):\n", i);
                        page = alp->thisArg->v.zBinding->v.zCS->disksched[i];
                        for(; page != NIL; LLSTEP(page))
                                printPageOfSched(page);
                }
        }
} printPageOfSched(page)
register struct SXLP *page;
{
register struct SXLE *elt;
int i;

for(i = page->nElts, elt = page->pageElts; --i >= 0; ++elt) {
                if(elt->cmd == DISKSEEK) {
                        printf("SEEK%d cyl=%d\n", elt->disk, elt->cylinder);
                        continue;
                }
                printf("%s%d cyl=%d, surf=%d, trx=%d\n",
                  elt->cmd == DISKREAD ? "RD" : "WRT", elt->disk,
                  elt->cylinder, elt->surface, elt->trxnum);
        }
}
```

It is claimed:

1. In a random access rotating disk digital data storage system wherein successive blocks of data of at least two data files are recorded in a pattern of a plurality of concentric circular tracks on said disk, each of said plurality of tracks having a plurality of sectors therearound for receiving said data and with one of said sectors at a particular rotational position of each such track designated to receive the beginning of a block of data, an improved method of positioning the recorded blocks of data on said circular tracks in order to reduce rotational latency, comprising the steps of:

recording the successive blocks of data for said at least two data files in physically non-sequential scattered positions in said circular tracks, and beginning the recording of blocks of data in each of said plurality of tracks at its said beginning sector, the beginning sector of each of said plurality of tracks on said disk being fixed at one of at least two different rotational positions with respect to said disk, wherein the different rotational positions of the beginning sectors are N in number and the beginning sector for substantially any given track is given by (S/N) (cyl. modulo N), where S is the total number of sectors in the given track and "cyl. modulo N" is the remainder resulting from dividing the track number by N.

2. The method according to claim 1 wherein the at least two data files consist of at least two simultaneous channels of digital sound data.

3. In a random access rotating disk digital data storage system wherein successive blocks of digital data of at least two sound channels are recorded in a pattern of concentric circular tracks on said disk, each track having a plurality of sectors therearound for receiving said data and with one of said sectors at a particular rotational position of each track designated to receive the start of a block of data, an improved system for positioning of the recorded blocks of data on said circular tracks in order to reduce rotational latency, comprising:

means receiving said at least two sound channels for simultaneously recording their successive blocks of data in physically non-sequential scattered positions in said circular tracks, the total different starting sectors of substantially all said tracks being N in number with the starting sector of substantially any given track being given by S/N(cyl. modulo N), where S is the total number of sectors in the given track and "cyl. modulo N" is the remainder resulting from dividing the track number by N.

4. The system according to claim 3 wherein N is equal to two.

5. A method of efficiently transferring, under the control of a central processing unit (CPU), blocks of digital data of a plurality of distinct files in a desired order between (1) a bulk storage memory characterized by having unequal access times to said blocks of data which are recorded in a scattered non-sequential manner, and (2) a random access buffer memory, the buffer memory being connected to simultaneously supply data blocks from the plurality of distinct files therein to another device, comprising the steps of:

developing in the CPU a transfer schedule for blocks of data by a method comprising the steps of:

identifying the locations of certain blocks of data stored in said bulk storage memory that are desired to be transferred into the buffer memory to form simultaneous and time sequential portions of each data file, determining the number of blocks of data already scheduled to be stored in said buffer memory for each file, determining from the number of blocks of data already scheduled to be stored in each buffer data file whether the amount of data in such files is balanced enough to avoid running out of data in any one file as the data is transferred to said another device, and designating an order of the blocks of data to be transferred in either of two ways: (1) if the amount of data in each buffer file is not balanced enough to avoid running out of data in any one file, data blocks are scheduled for transfer to the buffer files in a manner to increase such balance, or (2) if the amount of data in each buffer file is balanced enough to avoid running out of data in any of said plurality of files, data blocks are scheduled for transfer to the buffer files in an order that minimizes the access time thereto in the bulk storage memory, whereby efficiency of the transfer is maximized, thereby to develop a transfer schedule, and transferring said certain blocks of data between the bulk storage memory and the buffer memory in accordance with the transfer schedule, whereby said certain blocks of data are transferred at a high efficiency consistent with maintaining some balance in the number of buffered data blocks in each file.

6. The method according to claim 5,
wherein the step of determining whether balance exists includes the steps of:

determining the reciprocal of the number of blocks of data scheduled to be held in said buffer for each file, and summing those reciprocals, and wherein the step of designating an order includes the step of scheduling said certain blocks of data to be accessed either in a manner that substantially maximizes the efficiency of the transfer if said sum is greater than a given threshold or to increase such balance if said sum is less than said threshold.

7. The method according to claim 5 wherein the step of developing a transfer schedule comprises the additional steps of determining before a particular block of data is transferred from the bulk storage memory to the buffer memory whether a blank portion exists in said bulk storage memory into which a block of data can be transferred without any additional access time before transferring therefrom the next scheduled block of data, and if so, scheduling such a transfer into the bulk storage memory in advance of said next scheduled transfer from said bulk storage memory.

8. The method according to claim 5 wherein said data includes digital sound data and each of said files is an independent sound channel.

9. A method of efficiently transferring blocks of digital audio data from a plurality of audio channels betwen a bulk storage memory characterized by having unequal access times to said blocks of data which are recorded in a scattered non-sequential manner, and a random access buffer memory that is connected to a consumer or a source of said multi-channel digital audio data blocks, under the control of a central processing unit (CPU), comprising the steps of:

identifying in the CPU the locations of certain blocks of data stored in said bulk storage memory that are desired to be transferred into the buffer memory to form simultaneous and time sequential portions of each audio channel, determining the number of blocks of data already stored in said buffer memory for each channel and determining the reciprocal of each such number, obtaining an indication of urgency by the step of summing said reciprocals, thereby to determine an urgency quantity, and transferring blocks of data from the bulk storage memory to the buffered memory in a sequence that substantially minimizes the access times between them in said bulk storage memory or in an sequence that substantially equalizes the blocks of data stored in said buffer for each channel, depending upon whether the urgency quantity is respectively less than or greater than a set threshold urgency value, whereby said certain blocks of data are transferred at a high efficiency consistent with maintaining some balance in the number of buffered data blocks in each channel.

10. The method according to claim 9 wherein the step of obtaining an indication of urgency additionally includes the step of including in the urgency quantity an additional fixed amount if each of a certain number of channels has an amount of buffered data that is less than a predetermined amount.

11. The method according to claim 9 which comprises the additional steps of determining before a particular block of data is transferred from the bulk storage memory to the buffer whether a blank portion exists in said bulk storage memory into which a block of data can be transferred without any additional access time before transferring therefrom the next scheduled block of data, and if so, performing such a transfer into the bulk storage memory before the next scheduled transfer from said bulk storage memory.

12. In a system of efficiently transferring blocks of digital data of a plurality of distinct files between a bulk storage memory characterized by having unequal access times to said blocks of data which are recorded in a scattered non-sequential manner, and a random access buffer memory that is connected to a consumer or a source of said data files, a method of selecting at a particular instant in time the next block of data to be transferred from the bulk storage memory to the buffer, under the control of a central processing unit (CPU) comprising the steps of:

identifying in the CPU the storage locations on said bulk storage media of at least the next one block of data for each of said files to be transferred therefrom into said buffer memory, determining the number of blocks of data already stored in said buffer memory for each file, determining a reciprocal of said number of blocks of said data for each of the plurality of files, obtaining a summation of all said reciprocals, thereby to determine a quantity indicative of the number and balance of the blocks of data in the buffer memory for the plurality of files, comparing said quantity with a predetermined threshold constant, selecting one of the identified said next one blocks of data for transfer from the bulk storage memory to the buffer memory according to the following criteria:

(a) the next in order block of data for the file having the least number of buffered blocks if said quantity is greater than said threshold constant, or (b) the next in order block of data that requires the shortest time to access in said bulk storage memory if said quantity is less than said threshold constant, and whereby a block of data is selected for transfer in a manner that results in a high transfer efficiency consistent with maintaining some balance in the number of buffered data blocks in each file.

13. The method according to claim 12 which comprises the additional steps of:

determining before the selected one block of data is tranferred from the bulk storage memory to the buffer memory whether a blank portion exists in said bulk storage memory into which a block of data can be transferred without any additional access time before transferring therefrom said selected one block of data, and if this is found to be the case, performing such a transfer into the bulk storage memory at said blank portion thereof before transferring said selected one block from said media.

14. The method according to claim 12 which comprises the additional step of adjusting said quantity upwards, before the step of comparing said quantity with the threshold constant, if the number of blocks of data in the buffer memory for each of a predetermined number of channels is less than some predetermined low number.

15. The method according to claim 12 wherein the step of selecting the next one block of data for transfer additionally comprises selecting the block of data requiring the least access time even when said quantity is greater than said threshold constant so long as said quantity is only a small amount in excess of said threshold constant and the number of blocks of data in the buffer memory for the file of which this least access time data block is a part is not greatly in excess of the least number of blocks of data in the buffer memory for any file.

16. A system for efficiently transferring, according to a given transfer schedule, blocks of digital data of a plurality of distinct files between a rotating magnetic disk storage device and a random access buffer memory, comprising:

means for identifying the locations of certain blocks of data stored on said disk that are desired to be transferred into the buffer memory to form simultaneous and time sequential portions of each data file, means for determining the number of blocks of data already stored in said buffer memory for each file, means responsive to numbers ascertained by said block number determining means for determining whether the amount of data stored in the buffer in each file is enough to avoid running out of data in any one file as the data is simultaneously transferred out of the buffer to a data utilization device, means responsive to the data amount determining means for designating an order of the blocks of data to be transferred, said designating means including:

means responsive to the amount of data in each buffer file not being balanced enough to avoid running out of data in any one file for scheduling data blocks for transfer to the buffer files in a manner to increase such balance, and means responsive to the amount of data in each buffer file being balanced enough to avoid running out of data in any one file for scheduling data blocks for transfer to the buffer files in an order that minimizes the access time thereto in the storage device, and means responsive to the designating means for transferring blocks of data from said disk to the buffered memory in an order scheduled by said designating means, whereby said certain blocks of data are transferred from said disk at a high efficiency consistent with maintaining some balance in the number of buffered data blocks in each file.

17. The system according to claim 16 wherein said system additionally comprises means receiving blocks of data from said buffer for simultaneously recording successive blocks of data in physically non-sequential scattered positions in a pattern of a plurality of concentric circular tracks on said disk, and means for starting the recording of a block of data in each track at a certain sector thereof, said starting sector of each of the plurality of tracks on the disk being located at at least two different rotational positions therearound.

18. The system according to claim 17 wherein the rotational positions of the beginning sectors are two in number and are located substantially one-hundred-eighty degrees apart.

19. A system for storing and consuming blocks of digital data, comprising:
- a magnetic disk storage device characterized by the ability to store digital blocks of data for each of a plurality of data files in scattered physical locations of said device,
- a buffer memory characterized by the ability to store at least one block of said data for each of said plurality of files,
- means connected to said buffer memory for consuming an unbroken stream of a plurality of blocks of data therein at a predetermined rate in real time simultaneously from each of said plurality of files, and
- means connected to said disk storage device and said buffer memory for transferring blocks of data one at a time from the disk storage device to the buffer memory in an order that maintains enough data in said memory for each of said data files as required at any given instant by consuming means,
- whereby said consuming means is provided with a sufficient data supply to allow its simultaneous real time consumption of blocks of data from each of said files at said predetermined rate.

20. The system according to claim 19 wherein said digital data includes digitized sound information, and wherein said plurality of data files include a plurality of sound channels.

* * * * *

UNITED STATES PATENT AND TRADEMARK OFFICE
CERTIFICATE OF CORRECTION

PATENT NO. : 4,604,687

DATED : Aug. 5, 1986

INVENTOR(S) : Abbott

It is certified that error appears in the above-identified patent and that said Letters Patent is hereby corrected as shown below:

Claim 13 (col. 81, line 56):  "tranferred" should read --transferred--; and

Claim 19 (col. 84, line 9):  insert --said-- before "consuming means".

Signed and Sealed this

Twenty-eighth Day of October, 1986

[SEAL]

Attest:

DONALD J. QUIGG

Attesting Officer

Commissioner of Patents and Trademarks